US012707380B2

(12) United States Patent
Lei

(10) Patent No.: US 12,707,380 B2
(45) Date of Patent: Aug. 11, 2026

(54) SLICE ADMISSION CONTROL METHOD AND COMMUNICATION APPARATUS

(71) Applicant: HUAWEI TECHNOLOGIES CO., LTD., Shenzhen (CN)

(72) Inventor: Zhongding Lei, Singapore (SG)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 294 days.

(21) Appl. No.: 18/397,099

(22) Filed: Dec. 27, 2023

(65) Prior Publication Data

US 2024/0129843 A1 Apr. 18, 2024

Related U.S. Application Data

(63) Continuation of application No. PCT/CN2022/101465, filed on Jun. 27, 2022.

(30) Foreign Application Priority Data

Jun. 30, 2021 (CN) ......................... 202110734233.4

(51) Int. Cl.

*H04W 48/18* (2009.01)
*H04W 48/02* (2009.01)
*H04W 60/04* (2009.01)
*H04W 76/30* (2018.01)

(52) U.S. Cl.

CPC ........... *H04W 48/18* (2013.01); *H04W 48/02* (2013.01); *H04W 60/04* (2013.01); *H04W 76/30* (2018.02)

(58) Field of Classification Search

CPC ..... H04W 72/23; H04W 24/08; H04W 24/02; H04W 24/10; H04W 72/0453

See application file for complete search history.

(56) References Cited

U.S. PATENT DOCUMENTS

2021/0136715 A1* 5/2021 Jeong .................... H04W 60/00

FOREIGN PATENT DOCUMENTS

| | | | | |
|---|---|---|---|---|
| EP | 3846388 A1 | 7/2021 | | |
| WO | WO-2021224066 A1 * | 11/2021 | ......... | H04L 41/0894 |
| WO | 2022260472 A1 | 12/2022 | | |
| WO | 2023120046 A1 | 6/2023 | | |

OTHER PUBLICATIONS

SA WG2 Meeting #136-AH S2-2001477 "Solution for Key Issue #2:Deactivated PDU Session release for efficient PDU Session quota management",Apple,CATT,Incheon,Seoul,Jan. 13-17, 2020,total 4 pages,XP052456265.

Extended European Search Report issued in European Application No. 22831946.3, dated Sep. 2, 2024, pp. 1-18.

* cited by examiner

*Primary Examiner* — Khalid W Shaheed

(74) *Attorney, Agent, or Firm* — HAUPTMAN HAM, LLP

(57) ABSTRACT

A slice admission control method and a communication apparatus. For each slice of each UE, a determination is made to release a quota in a slice and that is occupied by the UE by using a single slice as a granularity and based on whether a slice use status of the UE is idle, or by setting valid duration in which the UE is admitted to the slice. The determination to release a quota in a slice and that is occupied by the UE enables the UE to not occupy a slice quota for a long time even in response to the UE not using the slice, and reduces a probability of a denial of services to another UE.

20 Claims, 7 Drawing Sheets

SLICE ADMISSION CONTROL METHOD AND COMMUNICATION APPARATUS

CROSS-REFERENCE TO RELATED APPLICATIONS

This application is a continuation of International Application No. PCT/CN2022/101465, filed on Jun. 27, 2022, which claims priority to Chinese Patent Application No. 202110734233.4, filed on Jun. 30, 2021. The disclosures of the aforementioned applications are hereby incorporated by reference in their entireties.

BACKGROUND

Currently, one terminal device is registered with a plurality of slices. In response to the terminal device performing slice registration, a network separately considers each slice that the terminal device requests to access, that is, the network allocates an admission quota of each slice by using each slice as a granularity, and admission of a slice is not associated with admission of another slice. However, in response to the terminal device being deregistered with the slices, the network does not perform cancellation by using each slice accessed by the terminal device as a unit (granularity), but is to simultaneously cancel all the slices accessed by the terminal device at a time. The main reason is that slice admission control of the terminal device is currently bound (associated) with registration and deregistration procedures of the terminal device. The registration procedure uses the slice as the granularity, and slices are accessed one by one (at the same time or different times). However, the deregistration procedure does not use the slice as the granularity, and a PLMN triggers a deregistration procedure only in response to the terminal device existing all the slices, or the terminal device exists all the slices in response to the PLMN triggering the deregistration procedure.

Therefore, the foregoing procedure causes the terminal device to occupy an unused slice quota for a long time. There are usually hundreds or thousands of terminal devices in a network. In response to each terminal device having the problem, network resources will be severely occupied, and a denial of services (DoS) to another terminal device is caused.

SUMMARY

At least one embodiment provides a slice admission control method and a communication apparatus, to reduce a resource waste, and to reduce a probability of a denial of services (DoS) to another terminal device.

According to a first aspect, a slice admission control method is provided, including: An access and mobility management function AMF sends a first request message to a network slice admission control function NSACF in response to there being no protocol data unit (PDU) sessions of a terminal device on a first slice or duration in which a terminal device is admitted to a first slice exceeds first duration. The first request message is used to request the NSACF to release an admission quota that is of the first slice and that is occupied by the terminal device. The AMF receives a first response message from the NSACF. The first response message indicates that the admission quota that is of the first slice and that is occupied by the terminal device is already released.

In the foregoing technical solution, compared with an existing deregistration procedure, for each slice of each UE, by using a single slice as a granularity, an admission quota that is of the first slice and that is occupied by the UE is released in response to there being no PDU sessions on the first slice (that is, based on whether the UE is idle). This avoids a case in which the UE occupies a slice quota for a long time even in response to the UE not using a slice, and this reduces a probability of a denial of services to another UE.

With reference to the first aspect, in some implementations of the first aspect, that the AMF sends the first request message to the NSACF in response to there being no protocol data unit (PDU) sessions of the terminal device on the first slice includes: The AMF sends the first request message to the NSACF in response to a last PDU session that is of the terminal device and that is on the first slice being already released. Alternatively, the AMF sends the first request message to the NSACF in response to there being no PDU sessions of the terminal device successfully established on the first slice within second duration. The second duration starts in response to the AMF authorizing the terminal device to access the first slice.

With reference to the first aspect, in some implementations of the first aspect, after the AMF receives the first response message sent by the NSACF, the method further includes: The AMF modifies an authorization status that is of the terminal device and that is in the first slice to a pre-authorized state. The pre-authorized state indicates that the terminal device is allowed to directly access the first slice in response to the first slice having an admission quota.

In an existing procedure, in response to the UE having no quota in the first slice, and an authorization status of the UE is “authorization rejected”, in response to the UE expecting to establish a PDU session on the first slice or access the first slice again, the UE first initiates a slice registration request or a service request procedure to the AMF. The UE initiates a PDU session establishment request to the AMF only after the AMF completes slice registration and authorizes the UE to access the first slice. However, in this embodiment, the UE in the pre-authorized state without a quota directly applies for establishing the PDU session on the first slice without performing a registration procedure. This saves resources of the UE and a network.

With reference to the first aspect, in some implementations of the first aspect, the method further includes: The AMF receives a second request message from the terminal device. The second request message is used to request to establish a first PDU session on the first slice for the terminal device. The AMF sends a first message to the NSACF. The first message is used to determine whether the first slice has an admission quota for the terminal device. The AMF receives a second response message from the NSACF. The second response message indicates that the terminal device is admitted to the first slice (that is, occupies an admission quota of the first slice) or that the first slice has no admission quota.

With reference to the first aspect, in some implementations of the first aspect, the method further includes: The second response message indicates that the terminal device is admitted to the first slice, and the AMF authorizes the terminal device to access the first slice. The AMF continues a procedure for establishing the first PDU session (that is, the AMF sends a message to an SMF to request to establish the first PDU session of the terminal device). Alternatively, the second response message indicates that the first slice has no admission quota, and the AMF rejects establishment of the first PDU session.

With reference to the first aspect, in some implementations of the first aspect, the method further includes: The AMF modifies the authorization status that is of the terminal device and that is in the first slice to an authorization rejected state. The authorization rejected state indicates that the terminal device is not allowed to access the first slice.

With reference to the first aspect, in some implementations of the first aspect, the method further includes: The AMF sends a second message to the terminal device. The second message is used to notify of the authorization status that are of the terminal device and that is in the first slice.

According to a second aspect, a slice admission control method is provided, including: A terminal device determines that an authorization status that is of the terminal device and that is in a first slice is a pre-authorized state. The pre-authorized state indicates that the terminal device is allowed to directly access the first slice in response to the first slice having an admission quota. The terminal device sends a second request message to an access and mobility management function AMF. The second request message is used to request to establish a first protocol data unit PDU session on the first slice for the terminal device.

In the foregoing technical solution, UE in the pre-authorized state without a quota directly applies for establishing the PDU session on the first slice without performing a registration procedure. This saves resources of the UE and a network.

According to a third aspect, a slice admission control method is provided, including: An access and mobility management function AMF sends, after first duration expires, a third request message to a network slice admission control function NSACF. The third request message is used to request the NSACF to release an admission quota that is of a first slice and that is occupied by a terminal device. The first duration is valid duration in which the terminal device is admitted to the first slice. The AMF receives a third response message from the NSACF. The third response message indicates that the admission quota that is of the first slice and that is occupied by the terminal device is already released.

In the foregoing technical solution, compared with an existing deregistration procedure, for each slice of each UE, by using a single slice as a granularity, an admission quota that is of the first slice and that is occupied by the UE is released in response to there being no PDU sessions on the first slice (that is, based on whether the UE is idle). This avoids a case in which the UE occupies a slice quota for a long time even in response to the UE not using a slice, and this reduces a probability of a denial of services to another UE.

With reference to the third aspect, in some implementations of the third aspect, before the AMF authorizes the terminal device to access the first slice, the method further includes: The AMF sends a fourth request message to the NSACF. The fourth request message is used to request the terminal device to access the first slice. The AMF receives a fourth response message from the NSACF. The fourth response message indicates that the terminal device is admitted to the first slice. The fourth response message includes the first duration.

With reference to the third aspect, in some implementations of the third aspect, the first duration is stored in the AMF.

With reference to the third aspect, in some implementations of the third aspect, after the first duration expires, the method further includes: The AMF determines that the terminal device has one or more protocol data unit PDU sessions on the first slice. The AMF sends the third request message to the NSACF after all the one or more PDU sessions are released.

With reference to the third aspect, in some implementations of the third aspect, after the first duration expires, the method further includes: The AMF sends a fourth message to the terminal device. The fourth message is used to notify the terminal device that the AMF is to release the admission quota that is of the first slice and that is occupied by the terminal device. The AMF receives a fifth message from the terminal device. The fifth message indicates that the terminal device does not continue to use the first slice. The AMF sends the third request message to the NSACF.

With reference to the third aspect, in some implementations of the third aspect, the method further includes: The AMF sends a sixth message to the terminal device in response to the terminal device being authorized to access the first slice. The sixth message includes the first duration. The AMF receives a seventh message from the terminal device before the first duration expires. The seventh message is used to request the AMF to update valid duration in which the terminal device is admitted to the first slice to third duration.

According to a fourth aspect, a slice admission control method is provided, including: A network slice admission control function NSACF receives a fourth request message from an access and mobility management function AMF. The fourth request message is used to request a terminal device to access a first slice. The NSACF sends a fourth response message to the AMF. The fourth response message indicates that the terminal device is admitted to the first slice. The fourth response message includes first duration. The first duration is valid duration in which the terminal device is admitted to the first slice.

According to a fifth aspect, a slice admission control method is provided, including: A terminal device receives a sixth message from an access and mobility management function AMF. The sixth message includes first duration. The first duration is valid duration in which the terminal device is admitted to the first slice. The terminal device sends a seventh message to the AMF before the first duration expires. The seventh message is used to request the AMF to update the valid duration in which the terminal device is admitted to the first slice to third duration.

According to a sixth aspect, a slice admission control method is provided, including: An access and mobility management function AMF determines that network slice specific authentication and authorization NSSAA for a first slice that a terminal device requests to access succeeds. The AMF sends a fifth request message to a network slice admission control function NSACF. The fifth request message is used to request to access the first slice by the terminal device. The AMF receives a fifth response message from the NSACF. The fifth response message indicates that the first slice has no admission quota. The AMF modifies an authorization status that is of the terminal device and that is in the first slice to a pre-authorized state. The pre-authorized state indicates that the terminal device is allowed to directly access the first slice in response to the first slice having an admission quota. Alternatively, the AMF modifies an authorization status that is of the terminal device and that is in the first slice to an authorization rejected state, and records that the terminal device successfully passes NSSAA for the first slice. The authorization rejected state indicates that the terminal device is rejected to access the first slice.

In the foregoing technical solution, in response to UE in the pre-authorized state re-requesting to access the first slice, the UE does not perform a registration procedure and/or a slice authentication procedure and is allowed to directly access the first slice in response to the first slice having an admission quota. This saves resources of the UE and a network. Alternatively, in response to the UE in the authorization rejected state re-requesting to access the first slice, because the AMF stores a "slice authentication successful" state, the UE does not initiate a slice authentication procedure. This also saves resources of the UE and a network.

According to an eighth aspect, this at least one embodiment provides a communication apparatus. The communication apparatus has a function of implementing the method according to the first aspect, a function of implementing the method according to the third aspect, or a function of implementing the method according to the sixth aspect. The function is implemented by hardware, or is implemented by hardware executing corresponding software. The hardware or the software includes one or more units corresponding to the foregoing function.

According to an eighth aspect, at least one embodiment provides a communication apparatus. The communication apparatus has a function of implementing the method according to the second aspect, or a function of implementing the method according to the fifth aspect. The function is implemented by hardware, or is implemented by hardware executing corresponding software. The hardware or the software includes one or more units corresponding to the foregoing function.

According to a ninth aspect, at least one embodiment provides a communication apparatus. The communication apparatus has a function of implementing the method according to the fourth aspect. The function is implemented by hardware, or is implemented by hardware executing corresponding software. The hardware or the software includes one or more units corresponding to the foregoing function.

According to a tenth aspect, at least one embodiment provides a communication apparatus, including at least one processor, where the at least one processor is coupled to at least one memory, the at least one memory is configured to store a computer program or instructions, and the at least one processor is configured to invoke and run the computer program or instructions from the at least one memory, to enable the communication apparatus to perform the method according to the first aspect, the method according to the third aspect, or the method according to the sixth aspect.

In an example, the communication apparatus is an access and mobility management function.

In another example, the communication apparatus is a component (for example, a chip or an integrated circuit) installed in an access and mobility management function.

According to an eleventh aspect, at least one embodiment provides a communication apparatus, including at least one processor, where the at least one processor is coupled to at least one memory, the at least one memory is configured to store a computer program or instructions, and the at least one processor is configured to invoke and run the computer program or instructions from the at least one memory, to enable the communication apparatus to perform the method according to the second aspect, or the method according to the fifth aspect.

In an example, the communication apparatus is a terminal device.

In another example, the communication apparatus is a component (for example, a chip or an integrated circuit) installed in the terminal device.

According to a twelfth aspect, at least one embodiment provides a communication apparatus, including at least one processor, where the at least one processor is coupled to at least one memory, the at least one memory is configured to store a computer program or instructions, and the at least one processor is configured to invoke and run the computer program or instructions from the at least one memory, to enable the communication apparatus to perform the method according to the fourth aspect.

In an example, the communication apparatus is a slice admission control function.

In another example, the communication apparatus is a component (for example, a chip or an integrated circuit) installed in a slice admission control function.

According to a thirteenth aspect, at least one embodiment provides a computer program product. The computer program product includes computer program code. In response to the computer program code being run on a computer, the method according to the first aspect is performed, the method according to the third aspect is performed, or the method according to the sixth aspect is performed.

According to a fourteenth aspect, at least one embodiment provides a computer program product. The computer program product includes computer program code. In response to the computer program code being run on a computer, the method according to the second aspect is performed, or the method according to the fifth aspect is performed.

According to a fifteenth aspect, at least one embodiment provides a computer program product. The computer program product includes computer program code. In response to the computer program code being run on a computer, the method according to the fourth aspect is performed.

According to a sixteenth aspect, at least one embodiment provides a computer-readable storage medium. The computer-readable storage medium stores computer instructions. In response to the computer instructions being run on a computer, the method according to the first aspect is performed, the method according to the third aspect is performed, or the method according to the sixth aspect is performed.

According to a seventeenth aspect, at least one embodiment provides a computer-readable storage medium. The computer-readable storage medium stores computer instructions. In response to the computer instructions being run on a computer, the method according to the second aspect is performed, or the method according to the fifth aspect is performed.

According to an eighteenth aspect, at least one embodiment provides a computer-readable storage medium. The computer-readable storage medium stores computer instructions. In response to the computer instructions being run on a computer, the method according to the fourth aspect is performed.

BRIEF DESCRIPTION OF DRAWINGS

FIG. 4 is a schematic flowchart in which UE currently initiates a PDU session after an admission quota that is for a terminal device and that is of a slice is canceled;

DESCRIPTION OF EMBODIMENTS

The technical solutions in at least one embodiment are described below with reference to the accompanying drawings.

The technical solutions provided in at least one embodiment are applied to various communication systems. In a communication system, a part operated by an operator is referred to as a public land mobile network (PLMN) (which is also referred to as an operator network or the like). The PLMN is a network established and operated by a government or an operator approved by the government to provide a land mobile communication service for the public, and is mainly a public network in which a mobile network operator (MNO) provides a mobile broadband access service for a user. The PLMN described in at least one embodiment is a network compliant with a specification of the 3$^{rd}$ generation partnership project (3GPP), which is referred to as a 3GPP network for short. The 3GPP network usually includes but is not limited to a 5th generation (5G) mobile communication network (5G network for short), a 4th generation (4G) mobile communication network (4G network for short), and another future communication system such as a 6G network and the like. For ease of description, a PLMN or a 5G network is used as an example for description in at least one embodiment.

Figure 1:
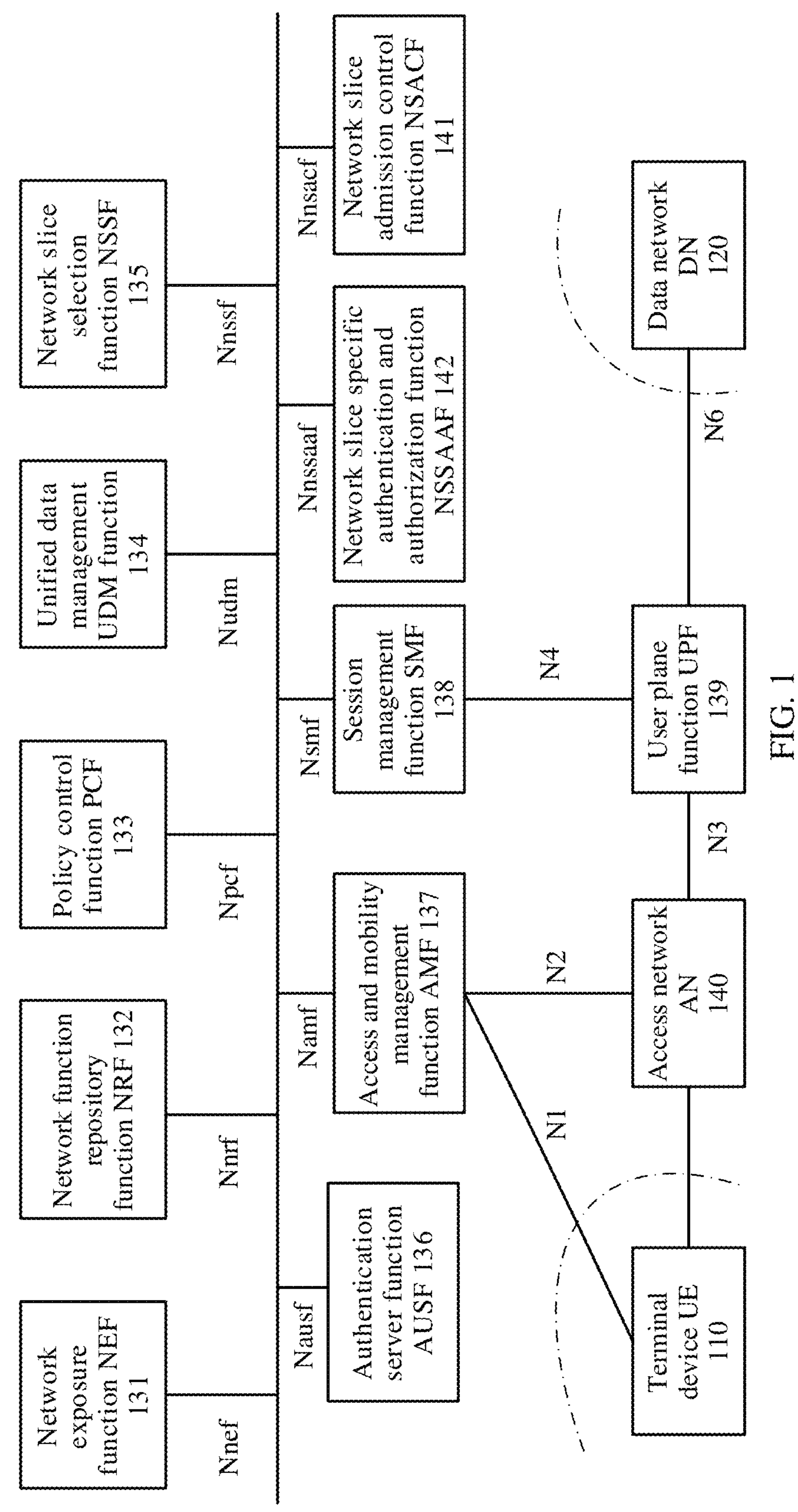
FIG. 1 is a schematic diagram of a network architecture according to at least one embodiment.

Refer to FIG. 1. FIG. 1 is a schematic diagram of a network architecture according to at least one embodiment. A 5G network architecture based on a service-based architecture in a non-roaming scenario defined in a 3GPP standardization process is used as an example. The network architecture includes three parts: a terminal device part, a PLMN, and a data network (DN).

The terminal device part includes a terminal device 110, and the terminal device 110 is also referred to as user equipment (UE). The terminal device 110 in at least one embodiment is a device having a wireless transceiver function, and communicates with one or more core network (CN) devices (which is also referred to as core devices) through an access network device (which is also referred to as an access device) in a radio access network (RAN) 140. The terminal device 110 is also referred to as an access terminal, a terminal, a subscriber unit, a subscriber station, a mobile station, a mobile console, a remote station, a remote terminal, a mobile device, a user terminal, a user agent, a user apparatus, or the like. The terminal device 110 is deployed on land, including an indoor device, an outdoor device, a handheld device, or a vehicle-mounted device; is deployed on water (such as a ship); or is deployed in the air (for example, on an aircraft, a balloon, or a satellite). The terminal device 110 is a cellular phone, a cordless phone, a session initiation protocol (SIP) phone, a smart phone, a mobile phone, a wireless local loop (WLL) station, a personal digital assistant (PDA), or the like. Alternatively, the terminal device 110 is a handheld device or a computing device that has a wireless communication function, another device connected to a wireless modem, a vehicle-mounted device, a wearable device, an unmanned aerial vehicle device, a terminal in the Internet of Things or Internet of Vehicles, a terminal in any form in a 5G network or a future network, relay user equipment, a terminal in a future evolved 6G network, or the like. The relay user equipment is, for example, a 5G residential gateway (RG). For example, the terminal device 110 is a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. A type, a kind, or the like of the terminal device is not limited in at least one embodiment. The terminal device and the UE in at least one embodiment are replaced with each other.

The PLMN includes but is not limited to a network exposure function (NEF) 131, a network function repository function (NRF) 132, a policy control function (PCF) 133, a unified data management (UDM) function 134, a network slice selection function (NSSF) 135, an authentication server function (AUSF) 136, an access and mobility management function (AMF) 137, a session management function (SMF) 138, a user plane function (UPF) 139, a (radio) access network ((R)AN) 140, a network slice admission control function (NSACF) 141, a network slice specific authentication and authorization function (NSSAAF) 142, and the like. In the foregoing PLMN, a part other than the (radio) access network 140 is referred to as a core network (CN) part.

A data network DN 120 is also referred to as a packet data network (PDN), and is generally deployed outside the PLMN, for example, a third-party network (certainly, the DN is alternatively deployed in the PLMN, and this is not limited herein). For example, the PLMN accesses a plurality of data networks DNs 120, and a plurality of services is deployed in the data networks DNs 120, to provide services such as a data service and/or a voice service for the terminal device 110. For example, the data network DN 120 is a private network of a smart factory, a sensor installed in a workshop of the smart factory is the terminal device 110, a control server of the sensor is deployed in the data network DN 120, and the control server provides a service for the sensor. The sensor communicates with the control server, to obtain instructions of the control server, transmit collected sensor data to the control server according to the instructions, and the like. For another example, the data network DN 120 is an internal office network of a company, a mobile phone or a computer of an employee of the company is the terminal device 110, and the mobile phone or the computer of the employee accesses information, data resources, and the like on the network internal office network of the company. The terminal device 110 establishes a connection to the PLMN through an interface (for example, an N1 interface in FIG. 1) provided by the PLMN, to use the services such as the data service and/or the voice service provided by the PLMN. The terminal device 110 further accesses the data network DN 120 through the PLMN, to use an operator service deployed in the data network DN 120 and/or a service provided by a third party. The third party is a service provider other than the PLMN and the terminal device 110, and provides another service such as a data service and/or a voice service for the terminal device 110.

A specific representation form of the third party is specifically determined based on an actual application scenario. This is not limited herein.

For example, the following briefly describes a network function in the PLMN.

1. The (R)AN 140 is a subnet of the PLMN, and is an implementation system between a service node (or the network function) in the PLMN and the terminal device 110. To access the PLMN, the terminal device 110 first passes through the (R)AN 140, and then is connected to the service node in the PLMN through the (R)AN 140. The (R)AN 140 in at least one embodiment is an access network, or is an access network device. This is not distinguished herein. The access network device is a device that provides a wireless communication function for the terminal device 110, and is also referred to as an access device, an (R)AN device, a network device, or the like. For example, the access network device includes but is not limited to a next-generation node base station (gNB) in a 5G system, an evolved nodeB (eNB) in an LTE system, a radio network controller (RNC), a node B (nodeB, NB), a base station controller (BSC), a base transceiver station (BTS), a home base station (home evolved nodeB, or home nodeB, HNB), a base band unit (BBU), a transmitting and receiving point (TRP), a transmitting point (TP), a small cell (pico), a mobile switching center, a network device in a future network, or the like. A specific type of the access network device is not limited in at least one embodiment. In systems using different radio access technologies, devices with functions of the access network device have different names.

Optionally, in some deployment of the access device, the access device includes a central unit (CU) and a distributed unit (DU), and the like. In some other deployment of the access device, the CU is further split into a CU-control plane (CP), a CU-user plane (UP), and the like. In still some other deployment of the access device, the access device is alternatively in an open radio access network (ORAN) architecture or the like. A specific deployment manner of the access device is not limited in at least one embodiment.

2. The network exposure function NEF (also referred to as a network exposure functional entity) 131 is a control plane function provided by an operator, and mainly enables the third party to use a service provided by a network.

3. The network function repository function NRF 132 is a control plane function provided by an operator, and is configured to maintain real-time information of all network function services in a network.

4. The policy control function PCF 133 is a control plane function provided by an operator, and supports a unified policy framework to govern network behavior, and provides a policy rule, subscription information related to a policy decision, and the like for another control function.

5. The unified data management UDM function 134 is a control plane function provided by an operator, and is responsible for storing information such as a subscription permanent identifier (UPI), a security context, subscription data of a subscriber in the PLMN, and the like.

6. The network slice selection function (NSSF) 135 is a control plane network function provided by the PLMN, and is responsible for determining a network slice instance, selecting a network function, namely, the AMF 137, and the like.

7. The authentication server function AUSF 136 is a control plane function provided by an operator, and is usually used for primary authentication, to be specific, authentication between the terminal device 110 (the subscriber) and the PLMN.

8. The access and mobility management function AMF 137 is a control plane network function provided by the PLMN, and is responsible for access control and mobility management in response to the terminal device 110 accessing the PLMN, for example, including functions such as mobility status management, allocation of a temporary user identity, user authentication and authorization, and the like.

9. The session management function SMF 138 is a control plane network function provided by the PLMN, and is responsible for managing a protocol data unit (PDU) session of the terminal device 110. The PDU session is a channel for transmitting a PDU, and the terminal device and the DN 120 transmit data to each other through the PDU session. The SMF 138 is responsible for establishment, maintenance, deletion, and the like of the PDU session. The SMF 138 includes session-related functions, for example, session management (for example, session establishment, session modification, and session release, including tunnel maintenance between the UPF 139 and the (R)AN 140), selection and control of the UPF 139, service and session continuity (SSC) mode selection, roaming, and the like.

10. The user plane function UPF 139 is a gateway provided by an operator, and is a gateway for communication between the PLMN and the DN 120. The UPF 139 includes user plane-related functions, for example, data packet routing and transmission, packet detection, service usage reporting, quality of service (QoS) processing, lawful interception, uplink packet detection, downlink data packet storage, and the like.

11. The network slice admission control function (NSACF) 141 is a network function used by the PLMN to monitor and control a number of terminal devices registered with a network slice. Generally, a maximum number of terminal devices that are served in each network slice monitored and controlled by the NSACF is configured on the NSACF.

12. A network slice specific authentication and authorization function (NSSAAF) 142 is a control plane network function provided by the PLMN, and is configured to support slice authentication performed by the terminal device 110 and the DN.

The network functions in the PLMN shown in FIG. 1 further includes a unified data repository (UDR) (not shown in the figure) and the like. Another network function included in the PLMN is not limited in at least one embodiment.

In FIG. 1, Nnef, Nnrf, Npcf, Nudm, Nnssf, Nausf, Namf, Nsmf, Nnssaaf, Nnsacf, N1, N2, N3, N4, and N6 are interface sequence numbers. For example, for meanings of the interface sequence numbers, refer to meanings defined in the 3GPP standard protocol. The meanings of the interface sequence numbers are not limited in at least one embodiment. In FIG. 1, an example in which the terminal device 110 is UE is merely used for description. Names of interfaces between the network functions in FIG. 1 are also merely examples. During specific implementation, the names of the interfaces in the system architecture are other names. This is not limited in at least one embodiment.

The foregoing names are defined merely for distinguishing between different functions, and should not constitute any limitation embodiments described herein. At least one embodiment does not exclude a possibility of using other names in the 5G network and another future network. For example, in a 6G network, some or all of the foregoing network elements still use terms in 5G, uses other names, or the like. For example, a mobility management network function in at least one embodiment is the AMF 137 shown in FIG. 1, or is another network function having the access and mobility management function AMF 137 in a future communication system. Alternatively, the mobility management network function in at least one embodiment is a mobility management entity (MME) in an LTE system, or the like.

For ease of description, in at least one embodiment, the access and mobility management function AMF 137 is referred to as an AMF for short, the terminal device 110 is referred to as UE, and the network slice admission control function NSACF 141 is referred to as an NSACF for short. To be specific, the AMF described below in at least one embodiment is replaced with a mobility management network function, the UE is replaced with a terminal device, and the NSACF is replaced with a network slice admission control function.

The schematic diagram of the network architecture shown in FIG. 1 is understood as a service-based architecture in a non-roaming scenario. In the service-based architecture, the PLMN orderly combines some or all network functions as used based on a specific scenario, to implement customization of a network capability and a service, and to deploy a dedicated network for different services, that is, implement 5G network slicing. With a network slicing technology, the operator responds to customer usage more flexibly and quickly and supports flexible assignment of network resources. For ease of understanding of embodiments described herein, the following further describes network slicing.

Network slicing (which is also briefly referred to as slicing) is simply understood as dividing a physical network of an operator into a plurality of virtual end-to-end networks, and each virtual network (including a device, an access network, a transport network, and a core network in a network) is logically independent, to avoid that a fault in any virtual network affects another virtual network. To meet diversified usage and slice isolation, independent management, operation, and maintenance are needed for services, and customized service functions and analysis capabilities are provided. Instances of different service types are deployed in different network slices, or different instances of a same service type are also deployed in different network slices.

A slice includes a group of network functions (network functions, NFs) and/or a subnet. For example, a slice includes the subnet (R)AN 140, the AMF 137, the SMF 138, and the UPF 139 in FIG. 1. Only one network function of each type is schematically illustrated in FIG. 1. During actual network deployment, there is a plurality of or dozens of network functions or subnets of each type. A plurality of slices is deployed in the PLMN. Each slice has different performance to meet usage of different applications and vertical industries. The operator "customizes" a slice based on usage of customers from the different vertical industries.

In response to the UE accessing a specific slice in the network, the UE provides or indicate the slice to be accessed by the UE to the core network based on an uplink message (that is, a message sent by the UE to the network, for example, a registration request, a service request, or a periodic registration update, and for ease of description, the following refers to the uplink message as a "request message"). Generally, indication information of a slice to be accessed is referred to as requested "network slice selection assistance information" (NSSAI). The NSSAI is actually a list or a set, and includes one or more pieces of single network slice selection assistance information (S-NSSAI). One piece of S-NSSAI is used to identify one network slice (or is a network slice type). The S-NSSAI is identification information of the slice.

In addition, a concept of a network slice instance identifier/identity (NSI-ID) is further defined in the standard. A slice identified by one piece of S-NSSAI is further instantiated into one or more slice instances, and each NSI-ID corresponds to one slice instance. In other words, the NSI-ID is also referred to as the identification information of the slice, and one piece of S-NSSAI corresponds to a plurality of NSI-IDs. In at least one embodiment, the S-NSSAI is used as an example for description, and the S-NSSAI and the NSI-ID are not strictly distinguished or limited. Descriptions of the S-NSSAI are also applicable to the NSI-ID.

In response to deploying slices, the operator (the PLMN) also allows some slice customers to have high autonomy and to participate in some slice management and control functions. Slice-level authentication is a network control function with limited slice customer participation. To be specific, authentication and authorization are performed for the slice to which the terminal device is to access, that is, "slice-level authentication", which is also referred to as "second-level authentication", "secondary authentication", and the like, and is briefly referred to as "slice authentication" in at least one embodiment.

Before the terminal device is allowed to access the network slice, the PLMN first performs "network-level authentication" on the terminal device, that is, the PLMN performs authentication based on subscription identification information used by the terminal device to subscribe to the PLMN. This authentication is usually referred to as primary authentication. Second, the PLMN performs authentication based on a subscription identifier used by the terminal device to subscribe to the DN, that is, the "slice authentication".

In FIG. 1 the NSACF is a network function newly defined in a 5G standard, and is a network function used by the PLMN to store, update, and control a number of terminal devices registered with a network slice. Specifically, the PLMN first configures, on the NSACF, a maximum number of terminal devices that is served by each network slice, that is, a quota or an admission limit. In response to the network authorizing a new terminal to access the slice or the terminal being deregistered with the slice, the NSACF determines, based on the quota, whether the network slice further accepts a new terminal access request, and stores and updates a number of admitted terminals in the slice in real time. The network slice herein is a network slice that uses admission control, and the network slice is monitored and controlled by a current NSACF. In the following descriptions, unless otherwise specified, all the network slices belong to such type of the slice that uses admission control. The following further provides descriptions with reference to a specific procedure defined in the 5G standard.

Figure 2:
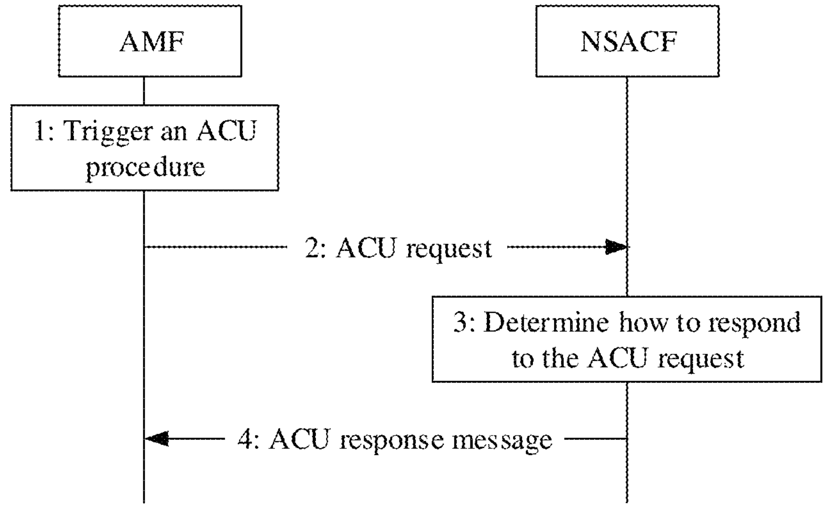
FIG. 2 is a schematic diagram of a procedure for querying network slice availability and updating a number of terminals.

In the 5G standard, a basic procedure for querying network slice availability and updating a number of terminals is currently defined, as shown in FIG. 2. This procedure describes a process of updating, on the NSACF, a number of terminals registered with a slice (identified as the S-NSSAI) (that is, increasing or decreasing a number of admitted terminal devices). The PLMN pre-configures, on the AMF, slices S-NSSAI that uses the process (that is, slices that uses admission control). These slices that use admission control are triggered by the AMF and send an availability check and update (ACU) request, an ACU request for short in the following, to the NSACF.

Step 1: The AMF triggers an ACU procedure.

According to a current standard, in response to ("when" herein indicates before, during, or after the procedure is performed) the AMF performing a procedure such as registration, deregistration, configuration update (UCU), or re-authentication, authorization revocation, and the like initiated by a slice authentication server (that is, an "authentication, authorization, and accounting" server, or an authentication, authorization, and accounting server, referred to as an AAA server for short herein) on the terminal device, the ACU procedure is triggered.

In response to determining to trigger the ACU procedure, the AMF first verifies that a slice identified as the S-NSSAI is a slice that the PLMN allows the terminal device to access. In other words, the AMF verifies that the slice S-NSSAI is in an "allowed-to-access NSSAI list" (that is, Allowed NSSAI) corresponding to the terminal device. In response to verifying that the S-NSSAI is in the "allowed-to-access NSSAI list" corresponding to the terminal device, the AMF sends the ACU request for the S-NSSAI to the NSACF, that is, step 2 is performed.

The Allowed NSSAI is the allowed or authorized NSSAI, and indicates pieces of S-NSSAI that are in the NSSAI requested by the UE and that the UE is allowed by the network to access or authorized to access. The AMF sends the pieces of S-NSSAI to the UE in an "Allowed NSSAI" information element (IE) in a registration accept (Registration Accept) message.

Step 2: The AMF sends the ACU request to the NSACF.

The request includes a terminal device identifier (S-NSSAI) and an update identifier (flag). This flag indicates whether the request is used to request "number increase" (for example, during registration) or "number decrease" (for example, during deregistration).

Step 3: After receiving the request, the NSACF determines, based on an admission status of the slice S-NSSAI stored in the NSACF, that is, a number of currently admitted terminal devices, how to respond to the ACU request of the AMF.

In response to the request of the AMF carrying a "number increase" or "+" identifier (flag), the NSACF first checks whether the terminal device is already included in terminal devices admitted to the slice S-NSSAI. In response to the terminal device being already included in terminal devices admitted to the slice S-NSSAI, a counter of the number of the admitted terminal devices remains unchanged, and the NSACF is ready to respond to the AMF that an admission quota of the slice is not full, that is, the terminal device is admitted to the slice S-NSSAI. Otherwise, the NSACF continues to check whether the number of the currently admitted terminal devices is less than an admission quota of the slice S-NSSAI. In response to the quota being sufficient (that is, a total number of the admitted terminal devices does not exceed the quota), the NSACF adds the terminal device to a list of the admitted terminal devices, increases the admission counter by 1 (that is, updates the stored number of the admitted terminal devices by +1), and is ready to respond to the AMF that the slice admission quota is not full, that is, the terminal device is admitted. In response to the quota being full, the counter remains unchanged, and the NSACF is ready to respond to the AMF that the quota is full, that is, the terminal device is rejected.

In response to the request of the AMF carrying a "number decrease" or "–" identifier (flag), the NSACF deletes the identifier of the terminal device from an admitted terminal device list, and decreases a counter of all the slices S-NSSAI that the terminal device is already allowed to access by 1.

Step 4: After determining according to step 3, the NSACF sends an ACU response to the AMF, and the AMF performs corresponding processing.

For example, in response to the ACU response indicating that the admission quota of the slice S-NSSAI is not full (that is, the terminal device is admitted and is already included in the admission quota of the slice), the AMF authorizes the terminal device to access the slice S-NSSAI, and notifies the terminal device of an authorization status of the slice S-NSSAI that the terminal device requests to access, that is, the slice S-NSSAI that the terminal device requests to access belongs to the Allowed NSSAI.

In response to the ACU response indicating that the admission quota of the slice S-NSSAI is full, the AMF rejects to authorize the terminal device to access the slice S-NSSAI, notifies the terminal device of the authorization status of the slice S-NSSAI that the terminal device requests to access, that is, the slice S-NSSAI that the terminal device requests to access belongs to Rejected NSSAI, and provides a rejection reason: The slice quota is full.

Optionally, the AMF notifies that the terminal device waits for a period of time and then performs access (that is, start a related timer, and in response to the timer stopping, the registration request is re-initiated).

The Rejected NSSAI is rejected NSSAI, and indicates pieces of S-NSSAI that are in the NSSAI that the terminal device requests to access and that are rejected by the AMF. The AMF sends the pieces of S-NSSAI to the terminal device by using a "Rejected NSSAI" IE in the registration accept message.

In FIG. 2, during registration and deregistration of the terminal device, control granularities (basic units) of the PLMN (for example, the AMF and the NSACF) for admission of the terminal device do not match. This is likely to cause slice quota abuse and a resource waste.

Specifically, in response to the terminal device being registered with slices, the PLMN separately considers each slice (S-NSSAI) that the terminal device requests to access, that is, the PLMN allocates an admission quota by using each slice as a granularity, and admission of a slice is not associated with admission of another slice. However, in response to the terminal device being deregistered with the slices, the PLMN does not perform cancellation by using each slice accessed by the terminal device as a unit (granularity), but simultaneously cancels all the slices accessed by the terminal device at a time. The main reason is that slice admission control of the terminal device is currently bound (associated) with registration and deregistration procedures of the terminal device. The registration procedure uses the slice as the granularity, and slices are accessed one by one. However, the deregistration procedure does not use the slice as the granularity, and the PLMN triggers a deregistration procedure only in response to the terminal device exiting all the slices, or the terminal device exits all the slices in response to the PLMN triggers the deregistration procedure.

Therefore, the foregoing procedure causes the terminal device to occupy the slice quota for a long time even in response to the terminal device not using the slice. For example, one UE simultaneously accesses eight slices. After the UE accesses the eight slices, the UE occupies quotas of the eight slices. In response to the UE using only one slice for a long time, and does not use the other slices, but because the UE does not exit the network, that is, the UE does not perform the deregistration procedure (that is, the UE still uses the service of one slice), the quotas of all the other slices are still occupied by the UE. There are usually hundreds of UEs in a network. In response to each UE having the problem, network resources will be severely occupied, and a denial of services (DoS) to another UE is caused.

Figure 3:
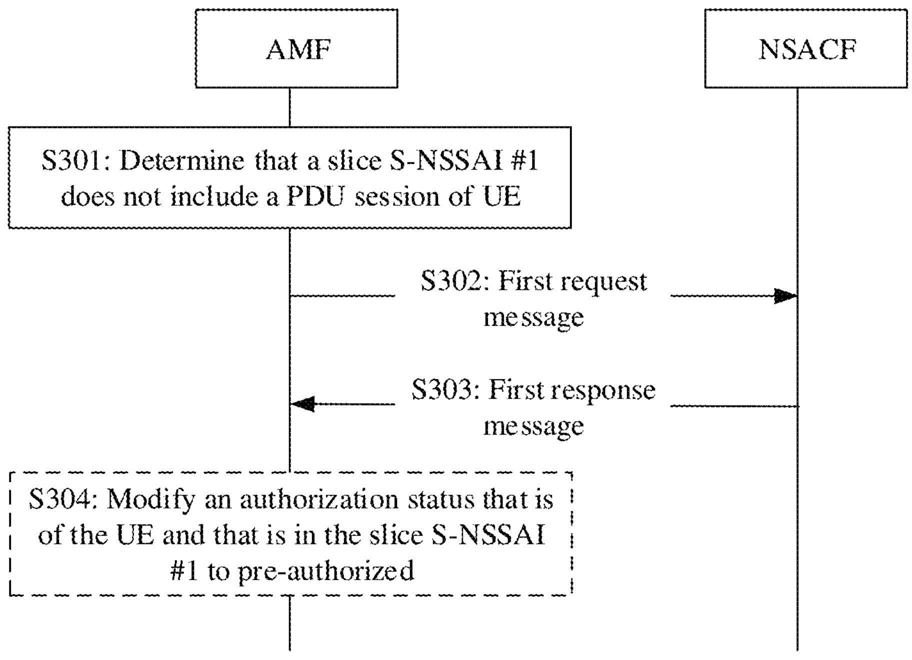
FIG. 3 is a schematic flowchart of a slice admission control method according to at least one embodiment.

In view of this, at least one embodiment provides an admission control method, to reduce a resource waste, and to reduce a probability of a denial of services (DoS) to another UE. Refer to FIG. 3. FIG. 3 is a schematic flowchart of a slice admission control method according to at least one embodiment.

S301: An AMF determines that there are no PDU sessions of UE on a slice S-NSSAI #1.

This step is also understood as follows: In response to the AMF determining that a use status that is of the UE and that is in the slice S-NSSAI #1 being an "idle state", and the idle state indicates that the UE currently does not use the slice S-NSSAI #1, S302 is triggered. Therefore, that there are no PDU sessions of UE on a slice S-NSSAI #1 is considered as an idle state. In other words, an absence of the PDU session is equivalent to the idle state, and a presence of the PDU session is equivalent to a non-idle state.

In an implementation, in response to the AMF determining that a last PDU session that is of the UE and that is on the slice S-NSSAI #1 being released, the AMF considers that a current use status that is of the UE and that is in the slice S-NSSAI #1 is the idle state, and triggers S302.

The SMF is a network function responsible for managing PDU sessions. To obtain information indicating that the last PDU session that is of the UE and that is on the slice S-NSSAI #1 is already released, the SMF has or adds a notification service indicating that the last PDU session is already released, and the AMF is authorized to subscribe to the service from the SMF.

Optionally, after the AMF determines that the use status that is of the UE and that is in the slice S-NSSAI #1 is the idle state, for example, a timer is set, and before the timer expires, in response to the UE not establishing a new PDU session on the slice S-NSSAI (according to an existing standard procedure, after establishing a new PDU session for the UE, the SMF notifies the AMF), the AMF triggers S302. In response to the AMF receiving from the SMF, before the timer expires, an notification that the UE successfully establishes a new PDU session on the slice S-NSSAI #1, the use status that is of the UE and that is in the S-NSSAI #1 changes from the idle state to the non-idle state, and the AMF does not trigger S302.

This implementation is applicable to a scenario in which the PDU session is already established on the slice S-NSSAI #1 after the UE is allowed to access the slice S-NSSAI #1. After all PDU sessions established by the UE on the slice S-NSSAI #1 are released, the use status that is of the UE and that is in the slice S-NSSAI #1 changes from the non-idle state to the idle state. In another implementation, the AMF starts timing second duration in response to authorizing the UE to access the slice S-NSSAI #1. Before the second duration expires, in response to the AMF not receiving (for example, the AMF does not receive from the SMF) a message indicating that the SMF and the UE successfully establishing the PDU session of the UE on the slice S-NSSAI #1, the AMF considers that the current use status that is of the UE and that is in the slice S-NSSAI #1 is the idle state, and triggers S302. The second duration is preset duration.

This implementation is applicable to a scenario in which the UE is initially allowed to access the slice S-NSSAI #1, and no PDU session is established on the slice. In response to the AMF not detecting (or is not notified by an notification message from the SMF), within the second duration, that the PDU session of the UE is established on the slice S-NSSAI #1, the UE does not actually use the slice. In other words, the AMF considers that the current use status that is of the UE and that is in the slice S-NSSAI #1 is the idle state.

In response to the AMF receiving, within the preset second duration, the message indicating that the UE successfully establishes the PDU session on the slice S-NSSAI #1, the use status that is of the UE and that is in the slice S-NSSAI #1 changes from the idle state (temporary) to the non-idle state, and the AMF does not perform S302.

In this step, an authorization status that is of the UE and that is in the slice S-NSSAI #1 is Allowed NSSAI.

S302: The AMF sends a first request message to an NSACF. The first request message is used to request the NSACF to release an admission quota that is of the slice S-NSSAI #1 and that is occupied by the UE.

Optionally, the requesting the NSACF to release the admission quota for the UE is that the "number decrease" or "−" flag is carried in the first request message.

There are no PDU sessions of UE on a slice S-NSSAI #1 is a condition for triggering S302. The condition is determined by the AMF, or is notified by another device to the AMF. In other words, S301 is an optional step.

S303: The AMF receives a first response message from the NSACF. The first response message indicates that the admission quota that is of the slice S-NSSAI #1 and that is occupied by the UE is already released.

In the foregoing technical solution, compared with an existing deregistration procedure, for each slice of each UE, by using a single slice as a granularity, a slice quota occupied by the UE is released based on the use status of the slice (that is, whether the slice is idle). This avoids a case in which the UE occupies the slice quota for a long time even in response to the UE does not use the slice, and this reduces a probability of a denial of services to another UE.

After the quota that is occupied by the UE and that is of the slice S-NSSAI #1 is released (that is, after the NSACF removes the UE from an admission list of the slice S-NSSAI #1), the authorization status of the UE associated with the slice S-NSSAI #1 also is correspondingly updated. For a specific procedure, refer to the descriptions in S304.

Optionally, S304: The AMF modifies the authorization status that is of the UE and that is in the slice S-NSSAI #1 to a pre-authorized state.

The pre-authorized state indicates that the UE is allowed to directly access the slice S-NSSAI #1 in response to the slice S-NSSAI #1 having an admission quota. In this embodiment, a difference between the pre-authorized state and an authorized state is as follows: In the pre-authorized state, the admission quota of the slice S-NSSAI #1 is full, and there is no admission quota for the UE. Once the admission quota is available (that is, a condition for having the admission quota is met), the pre-authorized state changes to the authorized state. The pre-authorized state is different from an existing authorization status in which the UE is rejected to access the slice S-NSSAI #1. For example, in the pre-authorized state, the UE is allowed to send a PDU session establishment request message. However, in an existing authorization rejected state, the UE is to first send a registration request message or a service request message, and only after the request is accepted, the UE is allowed to send the PDU session establishment request message (which is further described in FIG. 4 and FIG. 5 below).

The AMF, in different manners, stores the pre-authorized state that is of the UE and that is in the slice S-NSSAI #1 or sends the pre-authorized state to the UE.

Optionally, the pre-authorized state is understood as follows: The AMF saves and notifies the UE that an authorization status of the slice S-NSSAI #1 that the UE requests to access is still that the S-NSSAI #1 belongs to the Allowed NSSAI, and there is no admission quota of the slice S-NSSAI #1 for the UE.

Optionally, the pre-authorized state is understood as follows: The AMF saves and notifies the UE that an authorization status of the slice S-NSSAI #1 that the UE requests to access is that the S-NSSAI #1 belongs to Pending NSSAI ("pending" NSSAI), and there is no admission quota of the slice S-NSSAI #1 for the UE.

Optionally, the pre-authorized state is understood as follows: The AMF saves and notifies the UE that an authorization status of the slice S-NSSAI #1 that the UE requests to access is that the S-NSSAI #1 belongs to Rejected NSSAI. A rejection reason is that there is no admission quota of the slice S-NSSAI #1 for the UE. This manner is the same as an existing procedure for notifying the UE. However, in this embodiment, this manner in which the UE subsequently re-accesses a slice or establishes a PDU session on a slice different from the existing procedure.

In response to the authorization status being "pre-authorized", because there is no admission quota that is for the UE and that is of the slice S-NSSAI #1, the UE does not really access the slice S-NSSAI #1 currently.

In response to the authorization status of the UE in the existing procedure being "authorization rejected", and as shown in FIG. 4, in response to the UE expecting to establish the PDU session on the slice S-NSSAI #1, the UE first initiates a slice registration request or a service request procedure (S410 to S430, and many message interactions between the UE and the PLMN are omitted from S410 to S430) to the AMF. After the AMF and the UE complete the registration procedure (or the service request procedure) and authorize the UE to access the slice S-NSSAI #1 (S430), the UE initiates the PDU session establishment request to the AMF (S440). However, in this embodiment, the UE in the pre-authorized state without a quota directly applies for establishing the PDU session on the slice S-NSSAI #1 without performing the registration procedure or the service request procedure. This saves resources of the UE and the network.

Optionally, S305: The AMF notifies the UE of the authorization status that is of the UE and that is in the S-NSSAI #1.

For example, this step is alternatively bidirectional communication between the AMF and the UE, for example, notifying the authorization status that is of the UE and that is in the S-NSSAI #1 by using a UE configuration update (UCU) procedure.

Figure 5:
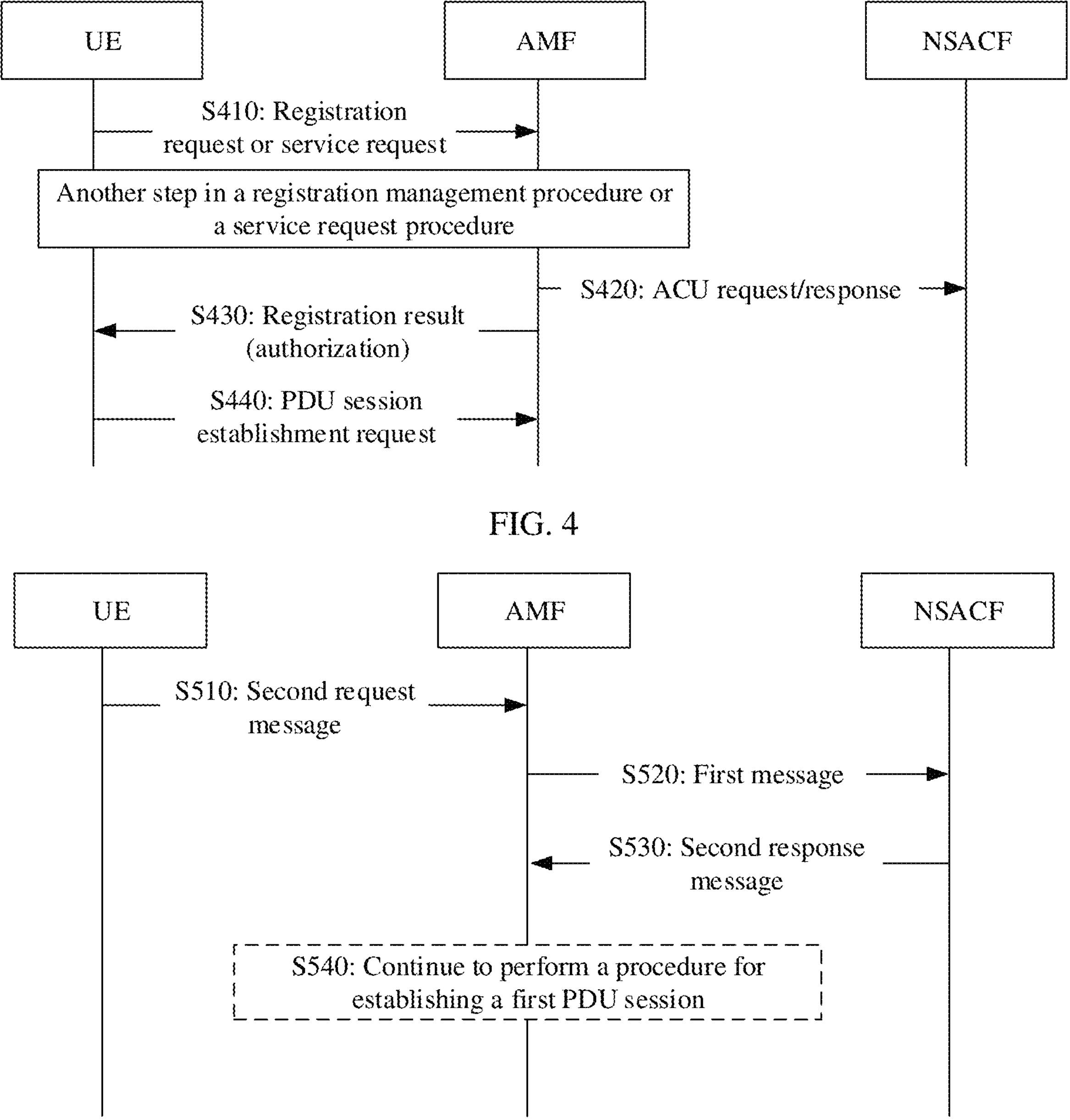
FIG. 5 is a schematic flowchart in which a terminal device initiates a PDU session in a pre-authorized state according to at least one embodiment.

With reference to FIG. 5, the following specifically describes a procedure in which the UE initiates the PDU session in the pre-authorized state.

S510: The UE sends a second request message to the AMF based on a current pre-authorized state in the slice S-NSSAI #1. The second request message is used to request to establish a first PDU session on the slice S-NSSAI #1 for the UE.

Correspondingly, the AMF receives the second request message.

S520: The AMF sends a first message to the NSACF. The first message is used to determine whether the slice S-NSSAI #1 has the admission quota for the UE.

There is a quota of the slice S-NSSAI #1 for the UE is a necessary condition for the UE to establish the PDU session on the slice S-NSSAI #1.

S530: The AMF receives a second response message from the NSACF. The second response message indicates that the S-NSSAI #1 has an admission quota for the UE (which is understood as that the UE is admitted to the slice S-NSSAI #1) or the slice S-NSSAI #1 has no admission quota.

In response to the second response message indicating that the UE is admitted to the slice S-NSSAI #1, the AMF authorizes the UE to access the slice S-NSSAI #1, and performs S540.

In this case, the authorization status of the UE changes from "pre-authorized" to "authorized", that is, in this case, the UE really accesses the slice S-NSSAI #1, and the slice has an admission quota for the UE.

Because the first PDU session is not yet successfully established in this case, the current use status that is of the UE and that is in the slice S-NSSAI #1 is the idle state.

In response to the second response message indicating that the slice S-NSSAI #1 has no admission quota, the AMF rejects establishment of the first PDU session, and does not perform S540.

S540: The AMF continues to perform a procedure for establishing the first PDU session.

For a PDU session establishment procedure, refer to a conventional technology. Only brief description is provided herein. The AMF continues to send the request message for establishing the first PDU session to the SMF. After receiving the request message for establishing the first PDU session, the SMF interacts with the UE (and another NF) to establish the first PDU session according to an existing standard procedure. After the first PDU session is successfully established, the SMF sends, to the AMF, a message indicating that the first PDU session is successfully established, and the AMF sends, to the UE, the message indicating that the first PDU session is successfully established.

In response to the first PDU session being successfully established, the current use status that is of the UE and that is in the slice S-NSSAI #1 changes from the idle state to the non-idle state.

"The AMF interacts with the NSACF" is used as an example for description of at least one embodiment. At least one embodiment is not limited to a case in which "the AMF interacts with the NSACF". Alternatively, another existing NF (for example, the SMF or a newly defined NF) is used to track a PDU status of the slice S-NSSAI, and to interact with the NSACF. In these scenarios, steps in FIG. 3 and FIG. 5 are to be adjusted correspondingly. For example, in response to the SMF interacting with the NSACF and the SMF initiates quota release and updates the NSACF is used as an example, corresponding adjustment is briefly described as follows.

FIG. 3 is used as an example. In S301 in FIG. 3, in response to the SMF determining that the last PDU session that is of the UE and that is on the slice S-NSSAI #1 being already released, the SMF directly initiates a quota release procedure (that is, the first request message) to the NSACF. Then, the SMF notifies the AMF that the quota that is occupied by the UE and that is of the S-NSSAI is already released (that is, notifies the AMF of the first response message). Subsequent steps are the same as the steps in FIG. 3. Alternatively, in S301 in FIG. 3, the AMF indicates the SMF to start the timer (timing the second duration). Before the timer expires, in response to the SMF not establishing the new PDU session for the UE in the S-NSSAI #1, the SMF initiates a quota release procedure (that is, the first request message) to the NSACF. Then, the SMF notifies the AMF that the quota that is occupied by the UE and that is of the S-NSSAI is already released (that is, notifies the AMF of the first response message). Subsequent steps are the same as steps in FIG. 3. Otherwise, the SMF does not initiate the quota release procedure. FIG. 5 is used as an example. The AMF in FIG. 5 sends the received second request message to the SMF, and S520 and S530 are performed between the SMF and the NSACF. Then, the SMF continues to perform the procedure for establishing the first PDU session.

The foregoing embodiment describes in detail quota control of a slice granularity. In the following, at least one embodiment provides another admission control method, to reduce a resource waste, and to reduce a probability of a denial of services (DoS) to another UE.

Figure 6:
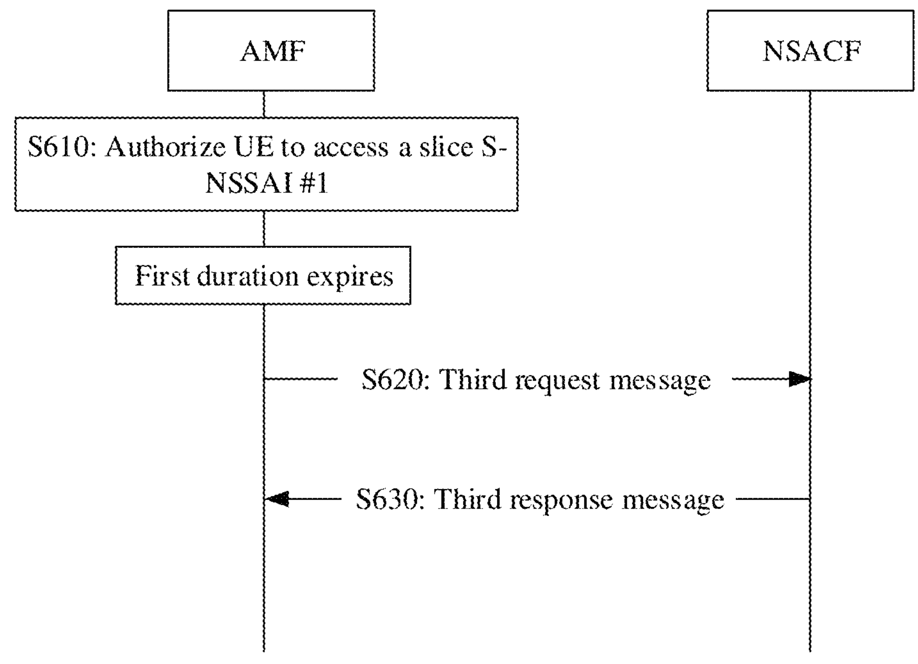
FIG. 6 is a schematic flowchart of another slice admission control method according to at least one embodiment.

Refer to FIG. 6. FIG. 6 is a schematic flowchart of another slice admission control method according to at least one embodiment.

S610: An AMF authorizes UE to access a slice S-NSSAI #1. The authorization indicates that the UE is allowed to access the slice S-NSSAI #1, and there is an admission quota that is for the UE and that is of the slice S-NSSAI #1.

An authorization status of the current slice S-NSSAI #1 that the UE requests to access is that the S-NSSAI #1 belongs to Allowed NSSAI.

S620: The AMF sends a third request message to an NSACF in response to first duration expiring.

The third request message is used to request the NSACF to release an admission quota that is of the slice S-NSSAI #1 and that is occupied by the UE. The first duration is valid duration in which the UE is admitted to the slice S-NSSAI #1.

Optionally, the requesting the NSACF to release the admission quota occupied by the UE is that the "number decrease" or "–" flag is carried in the third request message.

Optionally, the NSACF saves valid admission duration of each UE in an admitted UE list. In this way, the AMF obtains the first duration from the NSACF in response to interacting with the NSACF.

In a specific implementation, the AMF sends a fourth request message to the NSACF. The fourth request message is used to request or query an admission quota needed by the UE for accessing the slice S-NSSAI #1. The NSACF sends a fourth response message to the AMF. The fourth response message indicates that the UE is admitted to the slice S-NSSAI #1 (that is, an admission quota of the S-NSSAI #1 is not full), and the fourth response message includes the first duration.

Optionally, the AMF saves valid duration (that is, includes the first duration) of the admission quota for each UE.

Optionally, the method further includes: In response to the first duration expiring, the AMF determines that one or more PDU sessions of the UE is on the slice S-NSSAI #1, that is, determines that a use status that is of the UE and that is in the slice S-NSSAI #1 is "non-idle", and the AMF automatically delays releasing the admission quota for the UE. For example, after the one or more PDU sessions are released, that is, in response to the use status that is of the UE and that is in the slice S-NSSAI #1 being "idle", the AMF sends the third request message to the NSACF.

Optionally, the method further includes: In response to the first duration expiring, the AMF notifies the UE that the admission quota that is of the slice S-NSSAI #1 and that is occupied by the UE is to be released. In response to the UE not initiating a request to continue to use the slice, the AMF sends the third request message to the NSACF.

Optionally, the method further includes: In response to the AMF notifying the UE that the UE is authorized to access the slice S-NSSAI #1, the AMF sends the first duration to the UE. Before the first duration expires, the UE applies for updating valid duration in which the UE is admitted to the slice S-NSSAI #1 to third duration. In response to the UE no longer requesting to continue to use the slice after the third duration expires, the AMF sends the third request message to the NSACF.

S630: The AMF receives a third response message from the NSACF. The third response message indicates that the admission quota that is of the slice S-NSSAI #1 and that is occupied by the UE is already released.

For a procedure after the UE releases the quota in this embodiment, refer to the descriptions in S304 in FIG. 3 and in FIG. 5. Details are not described herein again.

"The AMF interacts with the NSACF" is used as an example for description of at least one embodiment. At least one embodiment is not limited to a case in which "the AMF interacts with the NSACF". Alternatively, another existing NF (for example, the SMF or a newly defined NF) is used to save or determine the second duration and to interact with the NSACF. In these scenarios, the steps in FIG. 6 are to be adjusted correspondingly. An adjustment method is similar to the description in FIG. 3 and FIG. 5. Details are not described herein again.

In the foregoing technical solution, a validity period of a slice admission quota is set, and a previously approved admission quota is periodically released. For UE that is to continue to use the slice, the UE applies for new valid admission duration (that is, a renewal period). For UE that does not use the slice, the admission quota is automatically released after expiration. This reduces a probability of a denial of services (DoS) to another UE.

The foregoing describes in detail a problem that during registration and deregistration of the terminal device, control granularities (basic units) of the PLMN (for example, the AMF and the NSACF) for admission of the terminal device do not match and the admission control method provided in at least one embodiment. The following describes another problem in the conventional technology: Network slice specific authentication and authorization (NSSAA) performed by the PLMN and the UE are not coordinated with admission control. This causes a waste of an NSSAA procedure.

Figure 7:
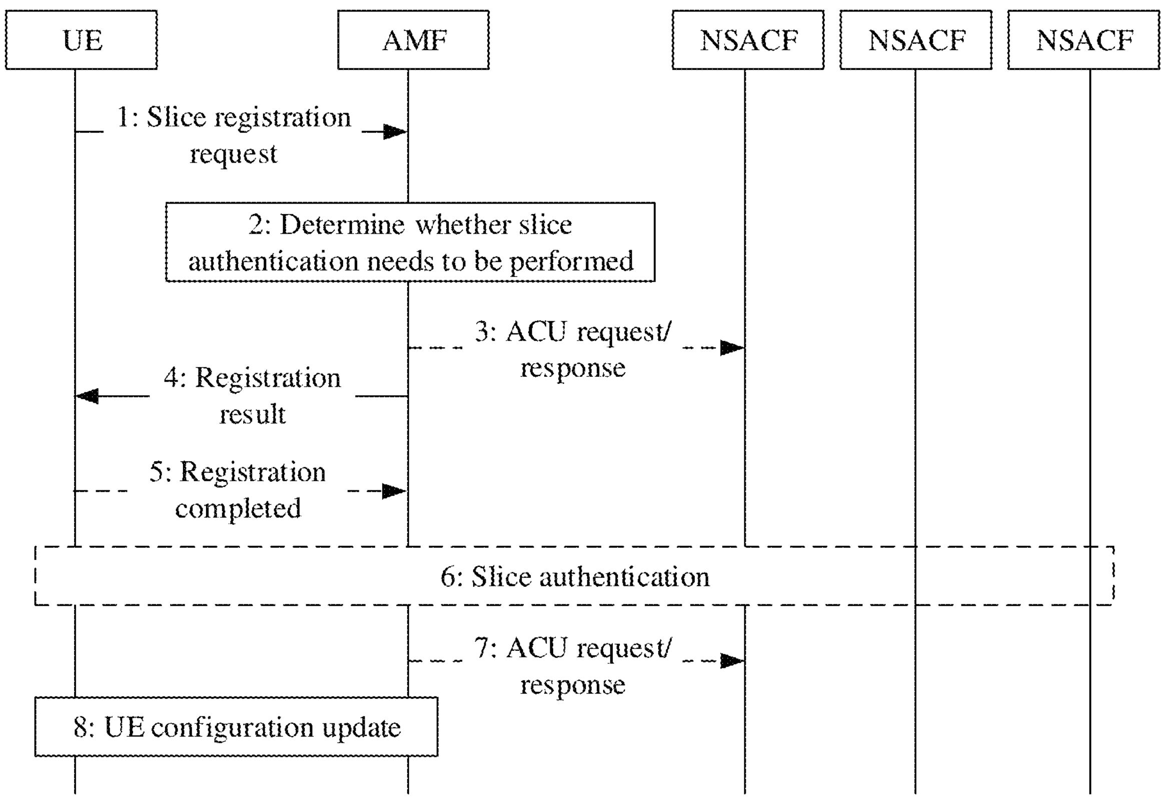
FIG. 7 is a schematic flowchart of slice registration that is of UE and that currently includes slice authentication.

For ease of understanding, a registration procedure that is of UE and that currently includes slice authentication is briefly described herein with reference to FIG. 7.

Step 1: The UE sends a slice registration request to a network (an AMF). The slice registration request includes a slice S-NSSAI that the UE requests to access.

Step 2: The AMF determines whether the slice authentication (that is, the NSSAA) procedure is to be performed for the slice S-NSSAI that the UE requests to access.

For example, the AMF determines, by using subscription information of the UE and a configuration of the slice, whether the slice authentication is to be performed for the slice S-NSSAI. In response to the slice authentication not being used, perform step 3. In response to the slice authentication being used, skip step 3 and perform step 4.

In response to the slice authentication not being performed for the slice S-NSSAI with the UE, the UE is authorized to access the slice S-NSSAI on a prerequisite that there is an admission quota of the slice S-NSSAI for the UE. Therefore, step 3 is performed to determine the admission quota.

Step 3: The AMF initiates an ACU procedure to the NSACF to query and update the admission quota of the slice S-NSSAI.

Step 4: The AMF sends a "registration result" message to the UE based on performance of step 2 and step 3. In this case, there are three results.

(1) In response to the slice authentication not being performed for the slice S-NSSAI, step 3 is performed.

A result in step 3 is that there is an admission quota. The AMF "authorizes" the UE to access the slice S-NSSAI.

The result in step 3 is that there is no admission quota. The AMF "rejects to authorize" the UE to access the slice S-NSSAI.

(2) In response to the slice authentication being performed for the slice S-NSSAI, step 3 is not performed.

The AMF puts the slice S-NSSAI into a Pending NSSAI ("pending" NSSAI) list.

Step 5: Optionally, the UE responds to the AMF with a "registration completed" message.

Step 6: In response to determining in step 2 that the slice authentication is to be performed for the slice S-NSSAI (that is, the S-NSSAI in the Pending NSSAI list in step 4), the slice authentication is performed for the slice S-NSSAI. In response to the slice authentication succeeding, perform step 7. Otherwise, skip step 7 and perform step 8.

Step 7: Refer to step 3.

Step 8: The AMF performs a UE configuration update (UCU) procedure on the UE based on execution results of step 6 and step 7, and updates a result whether the UE is authorized to access the slice. In this case, there are two results.

(1) In response to the slice authentication in step 6 succeeds, step 7 being performed.

A result in step 7 is that there is an admission quota. The AMF "authorizes" the UE to access the slice S-NSSAI.

The result in step 7 is that there is no admission quota. The AMF "rejects to authorize" the UE to access the slice S-NSSAI.

(2) In response to the slice authentication in step 6 failing, the AMF "rejects to authorize" the UE to access the S-NSSAI.

From the foregoing in a current procedure, in response to slice authentication being performed, the PLMN first performs a network slice specific authentication and authorization (NSSAA) procedure on the UE, and performs an admission control procedure (that is, an ACU procedure) only after the authentication succeeds. In response to the slice authentication for the S-NSSAI succeeding but the quota of the slice is full, according to the foregoing description, the AMF rejects access request of the UE. This causes a waste of performing the NSSAA procedure. The NSSAA procedure is performed between the terminal device and the AAA server of the DN, and a plurality of rounds of information exchange is to be performed. Especially in a roaming scenario, all information interactions are to be routed from a visiting PLMN to a home PLMN and then returned to the visiting PLMN. This occupies many resources, takes a long interaction procedure, and causes a waste of network resources.

In view of this, at least one embodiment provides a slice admission control method, to decouple impact of slice authentication and an admission quota on slice authorization, to improve NSSAA procedure efficiency, and to save resources.

Figure 8:
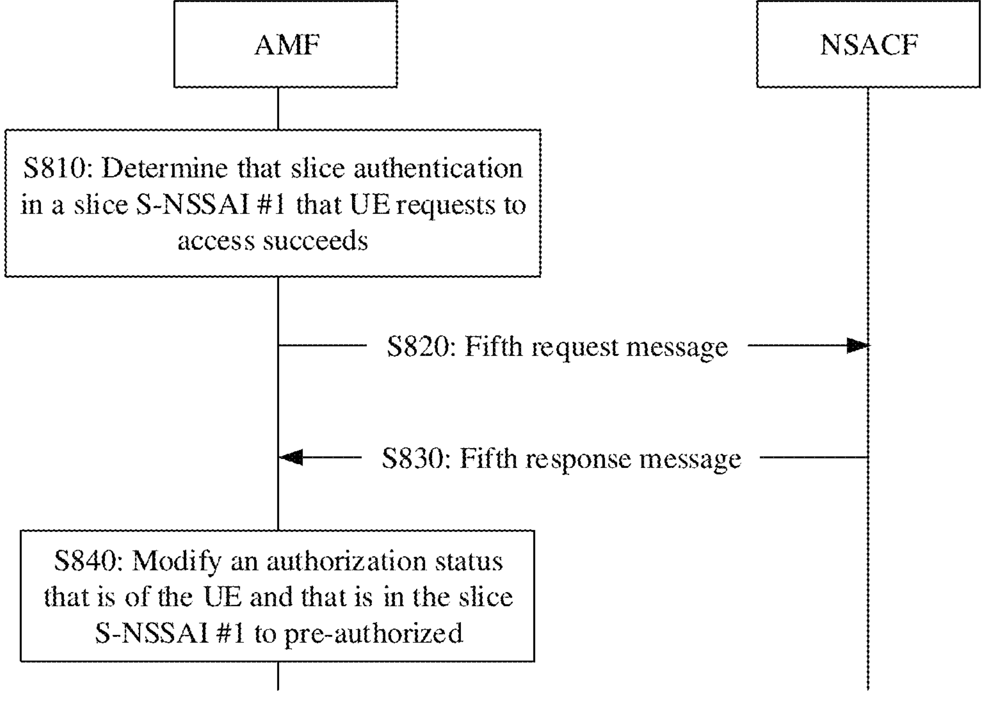
FIG. 8 is a schematic flowchart of still another slice admission control method according to at least one embodiment.

Refer to FIG. 8. FIG. 8 is a schematic flowchart of still another slice admission control method according to at least one embodiment.

S810: An AMF determines that slice authentication for a slice S-NSSAI #1 that UE requests to access succeeds.

S820: The AMF sends a fifth request message to an NSACF. The fifth request message is used to query and update an admission quota of the slice S-NSSAI #1 that the UE requests to access.

Correspondingly, the NSACF receives the fifth request message from the AMF.

This step is performed in response to the AMF determining that slice authentication is to be performed for the slice S-NSSAI #1.

S830: The AMF receives a fifth response message from the NSACF. The fifth response message indicates that the slice S-NSSAI #1 has no admission quota for the UE or the admission quota of the slice S-NSSAI #1 is full (that is, the NSACF cannot allocate the admission quota to the UE in the slice).

S840: The AMF modifies an authorization status that is of the UE and that is in the slice S-NSSAI #1 to a pre-authorized state. The pre-authorized state indicates that the UE is allowed to directly access the slice S-NSSAI #1 in response to the slice S-NSSAI #1 having an admission quota.

There is a plurality of understanding manners of the pre-authorized state in this embodiment. The following describes several understanding manners of the pre-authorized state one by one.

(1) The pre-authorized state is understood as follows: The AMF changes an authorization status that is of the UE and that is in the slice S-NSSAI #1 from Pending NSSAI to Allowed NSSAI. To be specific, the AMF saves and notifies that the authorization status that is of the UE and that is in the slice S-NSSAI #1 is that the S-NSSAI #1 belongs to the Allowed NSSAI, and there is no admission quota of the slice S-NSSAI #1 for the UE.

Optionally, the AMF saves or notifies the UE that the UE successfully passes the slice authentication for the slice S-NSSAI #1. Because that the S-NSSAI #1 in manner (1) belongs to the Allowed NSSAI already implies that the slice authentication succeeds, this step is optional.

Optionally, in the pre-authorized state, the AMF notifies the UE of fourth duration in which the UE re-accesses the S-NSSAI #1.

The following briefly describes subsequent steps that are performed by the PLMN (for example, the AMF) and the UE in the pre-authorized state in manner (1).

The AMF allows the UE to directly initiate a PDU session establishment procedure in the pre-authorized state in manner (1). After receiving a PDU session request, the AMF still determines whether the slice S-NSSAI #1 has an admission quota. In response to the slice S-NSSAI #1 having an admission quota, the AMF continues to perform the PDU session establishment procedure initiated by the UE. For related descriptions, refer to FIG. 5. In response to there being no admission quota, the PDU session request is rejected.

Optionally, in response to the AMF rejecting the PDU session request of the UE, the AMF keeps the authorization status of the UE still in the pre-authorized state, and optionally send fifth duration (that is, the PDU session establishment procedure is to be re-initiated after the fifth duration expires).

Optionally, in response to the AMF rejecting the PDU session request of the UE, the AMF updates the authorization status of the UE, for example, updates the authorization status to a rejected state.

A method for determining, by the AMF, whether the slice S-NSSAI #1 has an admission quota is descriptions in S520 and S530, or is an existing ACU procedure (described in FIG. 2). Alternatively, according to an admission control mode of the AMF, in response to an early admission control mode not being activated, the AMF has an admission quota by default, and S520 and S530 (or the ACU procedure) are not performed.

After the UE receives the authorization status that is sent by the AMF and that is of the UE in the slice S-NSSAI #1 in manner (1), the UE directly initiates the PDU session establishment procedure after a period of time (if the fourth duration or the fifth duration is received, the UE is to wait at least the fourth duration or the fifth duration), without first initiating a registration procedure and a slice authentication procedure. Certainly, the UE alternatively voluntarily re-initiates the registration procedure.

(2) The pre-authorized state is understood as follows: The AMF saves and notifies that an authorization status that is of the UE and that is in the slice S-NSSAI #1 is still Pending NSSAI (that is, the S-NSSAI #1 belongs to the Pending NSSAI), the UE successfully passes slice authentication for the slice S-NSSAI #1, and there is no admission quota of the slice S-NSSAI #1 for the UE.

Optionally, the AMF notifies the UE of fourth duration in which the UE re-accesses the S-NSSAI #1.

The following briefly describes subsequent steps that are performed by the PLMN (for example, the AMF) and the UE in the pre-authorized state in manner (2).

Optionally, the AMF allows the UE to directly initiate a PDU session establishment procedure in the pre-authorized state in manner (2). For descriptions of PDU session establishment performed by the AMF and the UE, refer to the foregoing manner (1). Details are not described again.

Optionally, the AMF does not allow the UE to directly initiate the PDU session establishment procedure in the pre-authorized state in manner (2), but the UE is to re-initiate a registration procedure (or a service request procedure/a UCU procedure). In response to the UE receiving the fourth duration or the fifth duration, the UE is to initiate after the fourth duration or the fifth duration expires. After the AMF receives a registration request re-initiated by the UE, a difference from an existing procedure is that because the AMF saves information indicating that "the UE successfully passes the slice authentication for the slice S-NSSAI #1", the AMF does not initiate a procedure for performing the slice authentication. That is, in step 2 in FIG. 7, the AMF determines that the UE does not (re-)perform the slice authentication for the slice S-NSSAI #1.

(3) The pre-authorized state is understood as follows: The AMF changes an authorization status that is of the UE and that is in the slice S-NSSAI #1 from Pending NSSAI to Rejected NSSAI (that is, the S-NSSAI #1 belongs to the Rejected NSSAI). The AMF saves and notifies that the authorization status that is of the UE and that is in the slice S-NSSAI #1 is the Rejected NSSAI (that is, the S-NSSAI #1 belongs to the Rejected NSSAI). A rejection reason is that there is no admission quota of the slice S-NSSAI #1 for the UE. The AMF saves (and optionally notifies the UE) that the UE successfully passes the slice authentication for the slice S-NSSAI #1.

Optionally, the AMF notifies the UE of fourth duration in which the UE re-accesses the S-NSSAI #1.

The following briefly describes subsequent steps that are performed by the PLMN (for example, the AMF) and the UE in the pre-authorized state in manner (3).

Optionally, the AMF allows the UE to directly initiate the PDU session establishment procedure in the pre-authorized state in manner (2) (if the fourth duration is sent, the UE initiates after the fourth duration expires). For descriptions of PDU session establishment performed by the AMF and the UE, refer to the foregoing manner 1. Details are not described again.

Optionally, the AMF does not allow the UE to directly initiate the PDU session establishment procedure in the pre-authorized state in manner (2), but the UE re-initiates a registration procedure (or a service request procedure/a UCU procedure). In response to the UE receiving the fourth duration or the fifth duration, the UE is to initiate after the fourth duration or the fifth duration expires. After the AMF receives a registration request re-initiated by the UE, a difference from an existing procedure is that because the AMF saves information indicating that "the UE successfully passes the slice authentication for the slice S-NSSAI #1", the AMF does not initiate a procedure for performing the slice authentication. That is, in step 2 in FIG. 7, the AMF determines that the UE does not to (re-)perform the slice authentication for the slice S-NSSAI #1.

From the foregoing in response to the UE re-requesting to access the slice S-NSSAI #1 in the pre-authorized state, the UE does not perform the slice authentication procedure (in some cases, the registration procedure is not needed either), and in response to the slice S-NSSAI #1 having the admission quota, the UE is allowed to directly access the slice S-NSSAI #1. This saves resources of the UE and the network.

In response to in step 2 in FIG. 7, the slice authentication not being used for the slice S-NSSAI #1, in response to there being no admission quota of the slice S-NSSAI #1 for the UE, the AMF alternatively pre-authorizes-authorize the UE to access the slice S-NSSAI #1.

Optionally, the pre-authorized state herein is understood as follows: The AMF saves and notifies the UE that the authorization status that is of the UE and that is in the slice S-NSSAI #1 is the Allowed NSSAI, and there is no admission quota of the slice S-NSSAI #1 for the UE.

Optionally, the pre-authorized state herein is understood as follows: The AMF saves and notifies the UE that the authorization status that is of the UE and that is in the slice S-NSSAI #1 is the Pending NSSAI, and there is no admission quota of the slice S-NSSAI #1 for the UE.

Optionally, the pre-authorized state herein is understood as follows: The AMF saves and notifies the UE that the authorization status that is of the UE and that is in the slice S-NSSAI #1 is the Rejected NSSAI. The rejection reason is that there is no admission quota of the slice S-NSSAI #1 for the UE.

Similarly, in response to the slice authentication not being used for the slice S-NSSAI #1, in response to the UE re-requesting to access the slice S-NSSAI #1 in the pre-authorized state, the UE directly accesses the slice S-NSSAI #1 without performing a registration procedure. This saves resources of the UE and the network.

Optionally, in step 2 shown in FIG. 7, after whether the slice authentication is to be performed is determined, step 3 is performed regardless of whether the slice authentication is to be performed for the S-NSSAI. In other words, even in response to the slice authentication being performed for the S-NSSAI, step 3 is also performed.

The purpose is to decouple step 2 from step 3. That is, whether to perform availability check and update ACU is not associated with whether to perform network slice specific authentication and authorization NSSAA. An advantage of this is that in response to the UE requesting to access a plurality of slices, and the slice authentication being used for some of the slices and not being used for some of the slices, the slice authentication is performed in step 3 at a time, and the ACU procedure is not to be performed twice (step 3 and step 7). For example, the UE requests to access slices S-NSSAI #1 and S-NSSAI #2, the slice authentication is needed for the S-NSSAI #1, and the slice authentication is not needed for the S-NSSAI #2. In an existing procedure, step 3 is performed for the S-NSSAI #2. However, step 3 is not to be performed for the S-NSSAI #1, and is to be performed after the slice authentication in step 7 succeeds. The ACU procedure is performed twice totally. However, in response to this manner being used, the ACU procedure for the two slices S-NSSAI #1 and S-NSSAI #2 is performed at a time in step 3. This saves one ACU procedure.

The foregoing describes in detail the slice admission control method provided in at least one embodiment. The following describes a communication apparatus provided in at least one embodiment.

Figure 9:
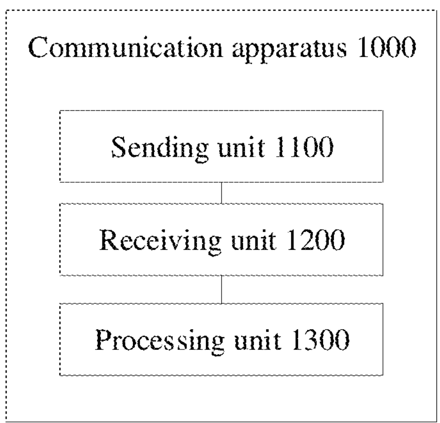
FIG. 9 is a schematic block diagram of a communication apparatus 1000 according to at least one embodiment.

Refer to FIG. 9. FIG. 9 is a schematic block diagram of a communication apparatus 1000 according to at least one embodiment. As shown in FIG. 9, the communication apparatus 1000 includes a sending unit 1100 and a receiving unit 1200.

The sending unit 1100 is configured to send a first request message to a network slice admission control function NSACF in response to there being no protocol data unit PDU sessions of a terminal device on a first slice or duration in which a terminal device is admitted to a first slice exceeds first duration. The first request message is used to request the NSACF to release an admission quota that is of the first slice and that is occupied by the terminal device, and the first duration is valid duration in which the terminal device is admitted to the first slice.

The receiving unit 1200 is configured to receive a first response message from the NSACF, and the first response message indicates that the admission quota that is of the first slice and that is occupied by the terminal device is already released.

Optionally, in an embodiment, that the sending unit sends the first request message in response to there being no protocol data unit PDU sessions of the terminal device on the first slice includes: The sending unit 1100 is configured to send the first request message to the NSACF in response to a last PDU session that is of the terminal device and that is on the first slice already being released. Alternatively, the sending unit 1100 is configured to send the first request message to the NSACF in response to the PDU session of the terminal device not being successfully established on the first slice within second duration. The second duration starts in response to an AMF authorizing the terminal device to access the first slice.

Optionally, the communication apparatus 1000 further includes a processing unit 1300, configured to perform processing or operations performed inside the access and mobility management function in the method embodiment corresponding to FIG. 3 or FIG. 6 of at least one embodiment.

Optionally, in another embodiment, after the receiving unit 1200 receives the first response message sent by the NSACF, the processing unit 1300 is configured to modify an authorization status that is of the terminal device and that is in the first slice to a pre-authorized state, and the pre-authorized state indicates that the terminal device is allowed to directly access the first slice in response to the first slice having an admission quota.

Optionally, in another embodiment, the receiving unit 1200 is further configured to receive a second request message from the terminal device. The second request message is used to request to establish a first PDU session on the first slice for the terminal device. The sending unit 1100 is further configured to send a first message to the NSACF. The first message is used to determine whether the first slice has an admission quota for the terminal device. The receiving unit 1200 is further configured to receive a second response message from the NSACF. The second response message indicates whether the first slice has an admission quota for the terminal device.

Optionally, the sending unit 1100 and the receiving unit 1200 are alternatively integrated into a transceiver unit. The transceiver unit has both a receiving function and a sending function. This is not limited herein.

In an implementation, the communication apparatus 1000 is the access and mobility management function in the method embodiment. In this implementation, the sending unit 1100 is a transmitter, and the receiving unit 1200 is a receiver. Alternatively, the receiver and the transmitter are integrated into a transceiver. The processing unit 1300 is a processing apparatus.

In another implementation, the communication apparatus 1000 is a chip or an integrated circuit installed in the access and mobility management function. In this implementation, the sending unit 1100 and the receiving unit 1200 are communication interfaces or interface circuits. For example, the sending unit 1100 is an output interface or an output circuit, the receiving unit 1200 is an input interface or an input circuit, and the processing unit 1300 is a processing apparatus.

A function of the processing apparatus is implemented by hardware, or is implemented by hardware executing corresponding software. For example, the processing apparatus includes a memory and a processor. The memory is configured to store a computer program, and the processor reads and executes the computer program stored in the memory, so that the communication apparatus 1000 performs operations and/or processing performed by the access and mobility management function in the method embodiments. Optionally, the processing apparatus includes only the processor, and the memory configured to store the computer program is located outside the processing apparatus. The processor is connected to the memory through a circuit/wire, to read and execute the computer program stored in the memory. For another example, the processing apparatus is a chip or an integrated circuit.

Figure 10:
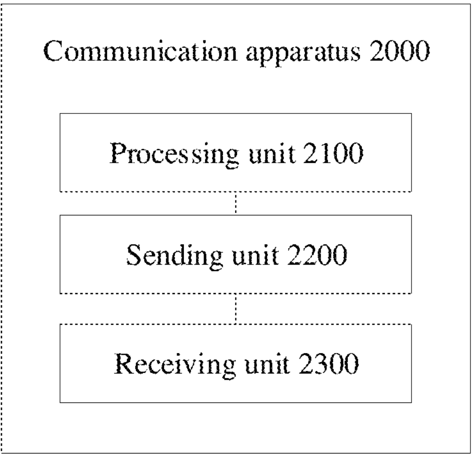
FIG. 10 is a schematic block diagram of a communication apparatus 2000 according to at least one embodiment.

Refer to FIG. 10. FIG. 10 is a schematic block diagram of a communication apparatus 2000 according to at least one embodiment. As shown in FIG. 10, the communication apparatus 2000 includes a processing unit 2100 and a sending unit 2200.

The processing unit 2100 determines that an authorization status that is of a terminal device and that is in a first slice is a pre-authorized state, and the pre-authorized state indicates that the terminal device is allowed to directly access the first slice in response to the first slice having an admission quota.

The sending unit 2200 is configured to send a second request message to an access and mobility management function AMF, and the second request message is used to request to establish a first protocol data unit PDU session on the first slice for the terminal device.

Optionally, the communication apparatus 2000 further includes a receiving unit 2300, configured to perform a receiving action performed by the terminal device in the method embodiment corresponding to FIG. 3 or FIG. 6 of at least one embodiment.

Optionally, the sending unit 2200 and the receiving unit 2300 is alternatively integrated into a transceiver unit. The transceiver unit has both a receiving function and a sending function. This is not limited herein.

In an implementation, the communication apparatus 2000 is the terminal device in the method embodiments. In this implementation, the sending unit 2200 is a transmitter, and the receiving unit 2300 is a receiver. Alternatively, the receiver and the transmitter are integrated into a transceiver. The processing unit 2100 is a processing apparatus.

In another implementation, the communication apparatus 2000 is a chip or an integrated circuit installed in the terminal device. In this implementation, the sending unit 2200 and the receiving unit 2300 are communication interfaces or interface circuits. For example, the sending unit 2200 is an output interface or an output circuit, and the receiving unit 2300 is an input interface or an input circuit. The processing unit 2100 is a processing apparatus.

A function of the processing apparatus is implemented by hardware, or is implemented by hardware executing corresponding software. For example, the processing apparatus includes a memory and a processor. The memory is configured to store a computer program, and the processor reads and executes the computer program stored in the memory, so that the communication apparatus 2000 performs operations and/or processing performed by the terminal device in the method embodiments. Optionally, the processing apparatus includes only the processor, and the memory configured to store the computer program is located outside the processing apparatus. The processor is connected to the memory through a circuit/wire, to read and execute the computer program stored in the memory. For another example, the processing apparatus is a chip or an integrated circuit.

Figure 11:
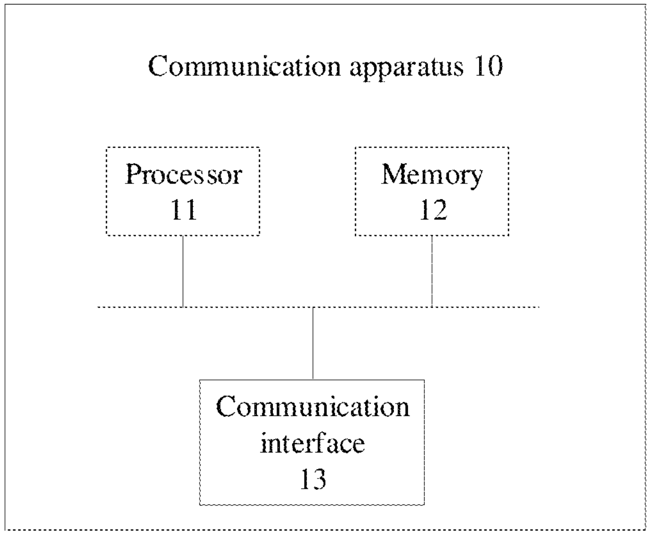
FIG. 11 is a schematic diagram of a structure of a communication apparatus 10 according to at least one embodiment.

Refer to FIG. 11. FIG. 11 is a schematic diagram of a structure of a communication apparatus 10 according to at least one embodiment. As shown in FIG. 11, the communication apparatus 10 includes one or more processors 11, one or more memories 12, and one or more communication interfaces 13. The processor 11 is configured to control the communication interface 13 to receive and send a signal. The memory 12 is configured to store a computer program. The processor 11 is configured to invoke the computer program from the memory 12 and to run the computer program. In this way, procedures and/or operations performed by the access and mobility management function in the method of at least one embodiment are performed.

For example, the processor 11 has a function of the processing unit 1300 shown in FIG. 9, and the communication interface 13 has a function of the sending unit 1100 and/or the receiving unit 1200 shown in FIG. 9. Specifically, the processor 11 is configured to perform the processing or the operations performed inside the access and mobility management function in the method corresponding to FIG. 3 or FIG. 6 of at least one embodiment, and the communication interface 13 is configured to perform a sending and/or receiving action performed by the access and mobility management function in the method embodiments corresponding to at least one embodiment.

In an implementation, the communication apparatus 10 is the access and mobility management function in the method corresponding to FIG. 3 or FIG. 6 of at least one embodiment. In this implementation, the communication interface 13 is a transceiver. The transceiver includes a receiver and a transmitter.

Optionally, the processor 11 is a baseband apparatus, and the communication interface 13 is a radio frequency apparatus.

In another implementation, the communication apparatus 10 is a chip installed in the access and mobility management function. In this implementation, the communication interface 13 is an interface circuit or an input/output interface.

Figure 12:
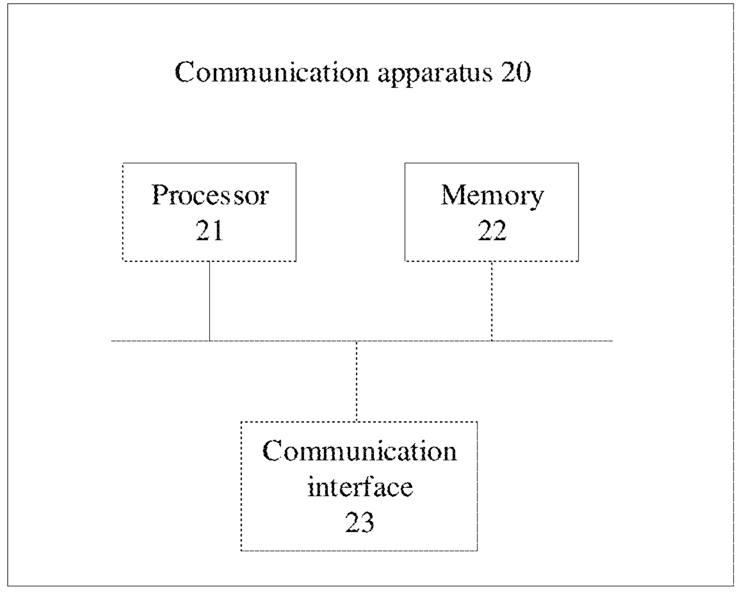
FIG. 12 is a schematic diagram of a structure of a communication apparatus 20 according to at least one embodiment.

Refer to FIG. 12. FIG. 12 is a schematic diagram of a structure of a communication apparatus 20 according to at least one embodiment. As shown in FIG. 12, the communication apparatus 20 includes one or more processors 21, one or more memories 22, and one or more communication interfaces 23. The processor 21 is configured to control the communication interface 23 to receive and send a signal. The memory 22 is configured to store a computer program. The processor 21 is configured to invoke the computer program from the memory 22 and to run the computer program. In this way, procedures and/or operations performed by the terminal device in the method corresponding to FIG. 3 or FIG. 6 of at least one embodiment are performed.

For example, the processor 21 has a function of the processing unit 2100 shown in FIG. 10, and the communication interface 23 has a function of the sending unit 2200 and/or the receiving unit 2300 shown in FIG. 10. Specifically, the processor 21 is configured to perform the processing or the operations performed inside the terminal device in the method corresponding to FIG. 3 or FIG. 6 of at least one embodiment, and the communication interface 23 is configured to perform a sending and/or receiving action performed by the terminal device in the method corresponding to FIG. 3 or FIG. 6 of at least one embodiment. Details are not described again.

In an implementation, the communication apparatus 20 is the terminal device in the method corresponding to FIG. 3 or FIG. 6 of at least one embodiment. In this implementation, the communication interface 13 is a transceiver. The transceiver includes a receiver and a transmitter.

Optionally, the processor 21 is a baseband apparatus, and the communication interface 23 is a radio frequency apparatus.

In another implementation, the communication apparatus 20 is a chip installed in the terminal device. In this implementation, the communication interface 23 is an interface circuit or an input/output interface.

A person of ordinary skill in the art is aware that, in combination with the examples described in embodiments disclosed herein, units and algorithm steps are implemented by electronic hardware or a combination of computer software and electronic hardware. Whether the functions are performed by hardware or software depends on particular applications and design constraints of the technical solutions. A person skilled in the art uses different methods to implement the described functions for each particular application, but the implementation is not considered to go beyond the scope of embodiments described herein.

A person skilled in the art understands that, for the purpose of convenient and brief description, for a detailed working process of the foregoing system, apparatus, and unit, refer to a corresponding process in the foregoing method embodiments, and details are not described herein again.

In at least one embodiment, the disclosed system, apparatus, and method is implemented in other manners. For example, the described apparatus embodiments are merely examples. For example, the division of units is merely logical function division and is other division in actual implementation. For example, a plurality of units or components is combined or integrated into another system, or some features are ignored or are not performed. In addition, the displayed or discussed mutual couplings or direct couplings or communication connections is implemented by using some interfaces. The indirect couplings or communication connections between the apparatuses or units are implemented in electrical, mechanical, or another form.

The units described as separate parts may or may not be physically separate, and parts displayed as units may or may not be physical units, are located in one position, or are distributed on a plurality of network units. Some or all of the units are selected based on actual usage to achieve the objectives of the solutions of embodiments.

In addition, functional units in at least one embodiment are integrated into one processing unit, each of the units exist alone physically, or two or more units are integrated into one unit.

In response to the functions being implemented in a form of a software functional unit and sold or used as an independent product, the functions are stored in a computer-readable storage medium. Based on such an understanding, the technical solutions of at least one embodiment essentially or parts contributing to the conventional technology or some of the technical solutions is embodied in a form of a software product. The computer software product is stored in a storage medium, and includes several instructions for instructing a computer device (which is a personal computer, a server, a network device, or the like) to perform all or some of the steps of the methods described in at least one embodiment. The foregoing storage medium includes any medium that stores program code, such as a USB flash drive, a removable hard disk, a read-only memory (ROM), a random access memory (RAM), a magnetic disk, an optical disc, or the like.

The foregoing descriptions are merely specific implementations of at least one embodiment, but are not intended to limit the protection scope of embodiments described herein. Any variation or replacement readily figured out by a person skilled in the art within the technical scope disclosed here shall fall within the protection scope of at least one embodiment. Therefore, the protection scope of embodiments described herein shall be subject to the protection scope of the claims.

What is claimed is:

1. A slice admission control method, comprising:

sending, by an access and mobility management function network element, a first request message to a network slice admission control function network element in response to there being no protocol data unit (PDU) sessions of a terminal device on a first slice or duration in which the terminal device is admitted to the first slice exceeds first duration, wherein the sending the first request message being used to request the network slice admission control function network element to release an admission quota that is of the first slice and that is occupied by the terminal device; and receiving, by the access and mobility management function network element, a first response message from the network slice admission control function network element, wherein the first response message indicates that the admission quota is already released.

2. The method according to claim 1, wherein the sending, by the access and mobility management function network element, the first request message to the network slice admission control function network element in response to there being no PDU sessions of the terminal device on the first slice includes:

sending, by the access and mobility management function network element, the first request message to the network slice admission control function network element in response to a last PDU session that is of the terminal device and that is on the first slice being already released; or sending, by the access and mobility management function network element, the first request message to the network slice admission control function network element in response to there being no PDU sessions of the terminal device successfully established on the first slice within second duration, wherein the second duration starts in response to the access and mobility management function network element authorizing the terminal device to access the first slice.

3. The method according to claim 2, wherein the method further comprises:

receiving, by the access and mobility management function network element, a notification from session management function network element, wherein the notification indicates that the last PDU session is already released.

4. The method according to claim 2, wherein the sending, by the access and mobility management function network element, the first request message to the network slice admission control function network element in response to the last PDU session that is of the terminal device and that is on the first slice being already released, includes:

sending, by the access and mobility management function network element, the first request message to the network slice admission control function network element in response to there being no PDU sessions of the terminal device successfully established on the first slice before a timer is expired, wherein the timer starts in response to the last PDU session being released.

5. The method according to claim 2, wherein the starting the second duration in response to the access and mobility management function network element authorizing the terminal device to access the first slice, includes:

starting the second duration in response to the access and mobility management function network element authorizing the terminal device to access the first slice and there being no PDU sessions of the terminal device established on the first slice yet.

6. The method according to claim 1, wherein the method further comprises:

notifying, by the access and mobility management function network element, the terminal device of an authorization status that is of the terminal device and that is in the first slice by using a UE configuration update procedure, wherein the authorization status indicating that the first slice does not belong to Allowed NSSAI of the terminal device, wherein the Allowed NSSAI is a list of network slice selection assistance information that the terminal device is allowed to access.

7. The method according to claim 6, wherein the authorization status indicating that the first slice does not belong to Allowed NSSAI of the terminal device includes:

the authorization status indicating that the first slice belongs to Rejected NSSAI of the terminal device, wherein the Rejected NSSAI is a list of network slice selection assistance information that the terminal device is rejected to access.

8. The method according to claim 1, wherein the sending the first request message being used to request the network slice admission control function network element to release the admission quota that is of the first slice and that is occupied by the terminal device, includes:

sending the first request message including a flag, wherein the flag indicates that a number of terminal devices registered with the first slice is to be decreased.

9. The method according to claim 1, wherein after the receiving, by the access and mobility management function network element, the first response message from the network slice admission control function network element, the method further comprises:

modifying, by the access and mobility management function network element, an authorization status that is of the terminal device and that is in the first slice to a pre-authorized state, wherein the pre-authorized state indicates that the terminal device is allowed to directly access the first slice in response to the first slice having an admission quota.

10. The method according to claim 9, wherein the method further comprises:

receiving, by the access and mobility management function network element, a second request message from the terminal device, wherein the second request message is used to request to establish a first PDU session on the first slice for the terminal device;

sending, by the access and mobility management function network element, a first message to the network slice admission control function network element, wherein the first message is used to determine whether the first slice has an admission quota for the terminal device; and receiving, by the access and mobility management function network element, a second response message from the network slice admission control function network element, wherein the second response message indicates whether the first slice has an admission quota for the terminal device.

11. A communication apparatus, comprising:

at least one memory storing a computer program or instructions; and at least one processor connected to the memory, wherein the processor is configured to execute the computer program or instructions to perform operations to:

send a first request message to a network slice admission control function network element in response to there being no protocol data unit (PDU) sessions of a terminal device on a first slice or duration in which the terminal device is admitted to the first slice exceeding a first duration, the first request message is used to request the network slice admission control function network element to release an admission quota that is of the first slice and that is occupied by the terminal device; and receive a first response message from the network slice admission control function network element, and wherein the first response message indicates that the admission quota is already released.

12. The communication apparatus according to claim 11, wherein the at least one processor is further configured to execute the computer program or the instructions stored in the at least one memory, to further enable the communication apparatus to:

send the first request message to the network slice admission control function network element in response to a last PDU session that is of the terminal device and that is on the first slice being already released; or send the first request message to the network slice admission control function network element in response to there being no PDU sessions of the terminal device successfully established on the first slice within second duration, wherein the second duration starts in response to the access and mobility management function network element authorizing the terminal device to access the first slice.

13. The communication apparatus according to claim 12, wherein the at least one processor is further configured to execute the computer program or the instructions stored in the at least one memory, to further enable the communication apparatus to:

send the first request message to the network slice admission control function network element in response to there being no PDU sessions of the terminal device successfully established on the first slice before a timer is expired, wherein the timer starts in response to the last PDU session being released.

14. The communication apparatus according to claim 12, wherein the second duration starts in response to the access and mobility management function network element authorizing the terminal device to access the first slice and there being no PDU sessions of the terminal device established on the first slice yet.

15. The communication apparatus according to claim 11, wherein the at least one processor is further configured to execute the computer program or the instructions stored in the at least one memory, to further enable the communication apparatus to:

notify the terminal device of an authorization status that is of the terminal device and that is in the first slice by using a UE configuration update procedure, wherein the authorization status indicates that the first slice does not belong to Allowed NSSAI of the terminal device, wherein the Allowed NSSAI is a list of network slice selection assistance information that the terminal device is allowed to access.

16. The communication apparatus according to claim 11, wherein the first request message includes a flag, wherein the flag indicates that a number of terminal devices registered with the first slice is to be decreased.

17. The communication apparatus according to claim 11, wherein the at least one processor is further configured to execute the computer program or the instructions stored in the at least one memory, to further enable the communication apparatus to:

determine that there are no PDU sessions of the terminal device on the first slice.

18. The communication apparatus according to claim 11, wherein the at least one processor is further configured to execute the computer program or the instructions stored in the at least one memory, to further enable the communication apparatus to:

modify an authorization status that is of the terminal device and that is in the first slice to a pre-authorized state, and the pre-authorized state indicates that the terminal device is allowed to directly access the first slice in response to the first slice having an admission quota.

19. The communication apparatus according to claim 18, wherein the at least one processor is further configured to execute the computer program or the instructions stored in the at least one memory, to further enable the communication apparatus to:

receive a second request message from the terminal device, and the second request message is used to request to establish a first PDU session on the first slice for the terminal device;

send a first message to the network slice admission control function network element, and the first message is used to determine whether the first slice has an admission quota for the terminal device; and receive a second response message from the network slice admission control function network element, wherein the second response message indicates whether the first slice has an admission quota for the terminal device.

20. A non-transitory computer-readable storage medium, wherein the non-transitory computer-readable storage medium stores computer instructions, and in response to the computer instructions being run on a computer causing at least one processor to execute the method according to claim 1.

* * * * *